(12) United States Patent
Abe et al.

(10) Patent No.: US 11,117,831 B2
(45) Date of Patent: Sep. 14, 2021

(54) GLASS PANEL UNIT, GLASS WINDOW, AND METHOD FOR MANUFACTURING GLASS PANEL UNIT

(71) Applicant: PANASONIC INTELLECTUAL PROPERTY MANAGEMENT CO., LTD., Osaka (JP)

(72) Inventors: Hiroyuki Abe, Osaka (JP); Eiichi Uriu, Osaka (JP); Kazuya Hasegawa, Osaka (JP); Masataka Nonaka, Osaka (JP); Tasuku Ishibashi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 174 days.

(21) Appl. No.: 16/337,880

(22) PCT Filed: Sep. 26, 2017

(86) PCT No.: PCT/JP2017/034669
§ 371 (c)(1),
(2) Date: Mar. 28, 2019

(87) PCT Pub. No.: WO2018/062140
PCT Pub. Date: Apr. 5, 2018

(65) Prior Publication Data
US 2020/0024189 A1 Jan. 23, 2020

(30) Foreign Application Priority Data

Sep. 30, 2016 (JP) .............................. JP2016-194690

(51) Int. Cl.
*E06B 3/663* (2006.01)
*C03C 27/06* (2006.01)
(Continued)

(52) U.S. Cl.
CPC .......... *C03C 27/10* (2013.01); *E06B 3/66304* (2013.01); *C03C 27/06* (2013.01); *E06B 3/663* (2013.01); *E06B 3/6612* (2013.01)

(58) Field of Classification Search
CPC ......... C03C 27/06; C03C 27/10; E06B 3/663; E06B 3/6612; E06B 3/6775;
(Continued)

(56) References Cited

U.S. PATENT DOCUMENTS

2003/0108693 A1* 6/2003 Futagami .............. E06B 3/6733
428/34
2005/0138892 A1 6/2005 Misonou
(Continued)

FOREIGN PATENT DOCUMENTS

JP H09-329783 A 12/1997
JP H11-311069 A 11/1999
(Continued)

OTHER PUBLICATIONS

Extended European Search Report dated Sep. 23, 2019, issued in the corresponding European Patent Application No. 17856090.0.
(Continued)

*Primary Examiner* — Phi D A
(74) *Attorney, Agent, or Firm* — McDermott Will and Emery LLP

(57) ABSTRACT

In s glass panel unit, a pitch of pillars is determined such that a distortion of a first panel and second panel is smaller than an interval between the first panel and the second panel. The distortion is calculated based on the interval between the first panel and the second panel, load loading compression fracture per one pillar of the multiple pillars, Young's moduli of the first panel and the second panel, thicknesses of the first panel and the second panel, and Poisson's ratios of the first panel and the second panel.

4 Claims, 13 Drawing Sheets

(51) Int. Cl.
 *C03C 27/10* (2006.01)
 *E06B 3/66* (2006.01)
(58) Field of Classification Search
 CPC .... E06B 3/67334; E06B 3/66333; E06B 3/66; C08G 73/1039; B32B 7/12; B32B 3/18; B32B 27/281; B32B 17/064; B32B 3/66304
 See application file for complete search history.

(56) References Cited

U.S. PATENT DOCUMENTS

| | | | | |
|---|---|---|---|---|
| 2006/0154005 | A1* | 7/2006 | Misonou | E06B 3/66304 428/34 |
| 2008/0166570 | A1* | 7/2008 | Cooper | E06B 3/6612 428/426 |
| 2009/0142521 | A1* | 6/2009 | Cooper | E06B 3/6612 428/34 |
| 2010/0279037 | A1* | 11/2010 | Huang | E06B 3/6612 428/34 |
| 2012/0151857 | A1* | 6/2012 | Heikkila | E06B 3/5454 52/204.593 |
| 2012/0213953 | A1* | 8/2012 | Dennis | C03C 27/06 428/34 |
| 2013/0309425 | A1* | 11/2013 | Dennis | E06B 3/6612 428/34 |
| 2014/0087098 | A1* | 3/2014 | Goodwin | E06B 3/6617 428/34 |
| 2014/0087099 | A1* | 3/2014 | Veerasamy | E06B 3/6775 428/34 |
| 2014/0212605 | A1 | 7/2014 | Son et al. | |
| 2015/0068666 | A1* | 3/2015 | Abe | E06B 3/6612 156/109 |
| 2017/0217816 | A1* | 8/2017 | Tian | C03B 23/24 |
| 2017/0253524 | A1* | 9/2017 | Weidner | C03C 17/3642 |
| 2018/0044235 | A1 | 2/2018 | Nonaka et al. | |

FOREIGN PATENT DOCUMENTS

| | | |
|---|---|---|
| JP | 2003-321255 A | 11/2003 |
| JP | 2008-266059 A | 11/2008 |
| WO | 2016/147604 A1 | 9/2016 |

OTHER PUBLICATIONS

International Search Report and Written Opinion issued in International Patent Application No. PCT/JP2017/034669, dated Jan. 9, 2018; with partial English translation.

* cited by examiner

GLASS PANEL UNIT, GLASS WINDOW, AND METHOD FOR MANUFACTURING GLASS PANEL UNIT

CROSS-REFERENCE OF RELATED APPLICATIONS

This application is the U.S. National Phase under 35 U.S.C. § 371 of International Patent Application No. PCT/JP2017/034669, filed on Sep. 26, 2017, which in turn claims the benefit of Japanese Application No. 2016-194690, filed on Sep. 30, 2016, the entire disclosures of which Applications are incorporated by reference herein.

TECHNICAL FIELD

The present disclosure relates to a glass panel unit, a glass window, and a method for manufacturing glass panel unit.

BACKGROUND ART

Patent Literature 1 discloses a multi-pane glazing. The multi-pane glazing disclosed in Patent Literature 1 includes, as illustrated in FIG. 13A and FIG. 13B, a first panel 20 including a first glass plate 21, a second panel 30 including a second glass plate 31 and arrange to face the first panel 20, and a seal 40 hermetically bonding the first panel 20 and the second panel 30 together. The multi-pane glazing further includes multiple pillars (spacers) 70 arranged in an internal space 500, which forms a reduced-pressure space when hermetically enclosed by the first panel 20, the second panel 30, and the seal 40, so as to be in contact with the first panel 20 and the second panel 30.

When exposed to the atmospheric pressure, the first panel 20 and the second panel 30 attempt to flex themselves toward each other (i.e., in a direction in which these panels come closer to each other). Meanwhile, the spacers 70 are into contact with, and support, both of the first panel 20 and the second panel 30 that are going to flex themselves, thus maintaining the internal space 500.

When an impact force acts on a plate surface (a plate surface of the first glass plate 21) of the multi-pane glazing of Patent Literature 1, the first panel 20 attempts to flex toward the second panel 30 according to the impact force acting thereon. In this context, if the impact force acts on the first panel 20 from a falling steel ball 82 at a position where one of the pillars 70 is arranged, as shown in FIG. 13A, the first panel 20 is less likely to be flexed. The first panel 20 is thus less likely to make contact with the second panel 30, which can reduce the probability that the first panel 20 or the second panel 30 be damaged due to the contact of the first panel 20 against the second panel 30.

However, if the impact force acts on the first panel 20 at an intermediate position between pillars 70, as shown in FIG. 13B, the first panel 20 tends to flex toward the second panel 30 to make contact with the second panel 30, leading to the damage of the first panel 20 or the second panel 30 caused by the contact between the first panel 20 and the second panel 30.

CITATION LIST

Patent Literature

Patent Literature 1: JPH11-311069A

SUMMARY OF INVENTION

It is therefore an object of the present invention to provide a glass panel unit and a glass window, which has a reduced probability of the first panel and the second panel making contact with each other even when an impact force acts thereon, and a method for manufacturing the glass panel unit.

A glass panel unit according to an aspect of the present disclosure includes: a first panel including at least a first glass plate; and a second panel including at least a second glass plate and arranged to face the first panel with a predetermined interval left with respect to the first panel. The glass panel unit includes: a seal arranged between the first panel and the second panel to hermetically bond the first panel and the second panel together; and an internal space configured to form a reduced-pressure space by being hermetically enclosed by the first panel, the second panel, and the seal. The glass panel unit includes multiple pillars made of resin, the multiple pillars being arranged in the internal space at individual intersections of a square or rectangular lattice of constant lattice intervals, including a predetermined pitch, so as to be in contact with the first panel and the second panel.

The predetermined pitch of the multiple pillars is determined such that a distortion of the first panel and second panel is smaller than the predetermined interval between the first panel and the second panel. The distortion is calculated based on the predetermined pitch, load loading compression fracture per one pillar of the multiple pillars, Young's moduli of the first panel and the second panel, thicknesses of the first panel and the second panel, and Poisson's ratios of the first panel and the second panel.

A glass window according to an aspect of the present disclosure includes the glass panel unit of the aspect, and a window frame fitted onto a peripheral portion of the glass panel unit.

A method for manufacturing glass panel unit according to an aspect of the present disclose includes an adhesive disposing step, a pillar arranging step, an opposite disposing step, an internal space forming step, a pressure reducing step, and a reduced-pressure space forming step.

The adhesive disposing step includes disposing a thermal adhesive in a frame on a first panel including at least a first glass plate.

The pillar arranging step includes disposing multiple pillars made of resin on the first panel so as to be arranged at individual intersections of a square or rectangular lattice of constant lattice intervals, including a predetermined pitch.

The opposite disposition step includes disposing a second panel including at least a second glass plate to face the first panel.

The internal space forming step includes heating a glass composite including the first panel, the second panel, and the thermal adhesive to melt the thermal adhesive to form an internal space enclosed by the first panel, the second panel and a melted substance of the thermal adhesive with an evacuation passage left opened to an outside, the evacuation passage being capable of evacuating gas to the outside.

The pressure reducing step includes removing gas in the internal space to reduce a pressure of the internal space.

The reduced-pressure space forming step includes hermetically enclosing the internal space while keeping the internal space in a pressure-reduced state to form a reduced-pressure space enclosed hermetically.

The predetermined pitch of the multiple pillars is determined such that a distortion of the first panel and second panel is smaller than an interval between the first panel and the second panel. The distortion is calculated based on the predetermined pitch, load loading compression fracture per one pillar of the multiple pillars, Young's moduli of the first panel and the second panel, thicknesses of the first panel and the second panel, and Poisson's ratios of the first panel and the second panel.

DESCRIPTION OF EMBODIMENTS

First to third embodiments each generally relate to glass panel units (the third embodiment further relates to a glass window), and more particularly relate to a glass panel unit including a first panel, a second panel, a seal hermetically bonding the first panel and the second panel, and a pillar arranged in an internal space hermetically enclosed by the first panel, the second panel and the seal so as to be in contact with the first panel and the second panel.

Figure 1:
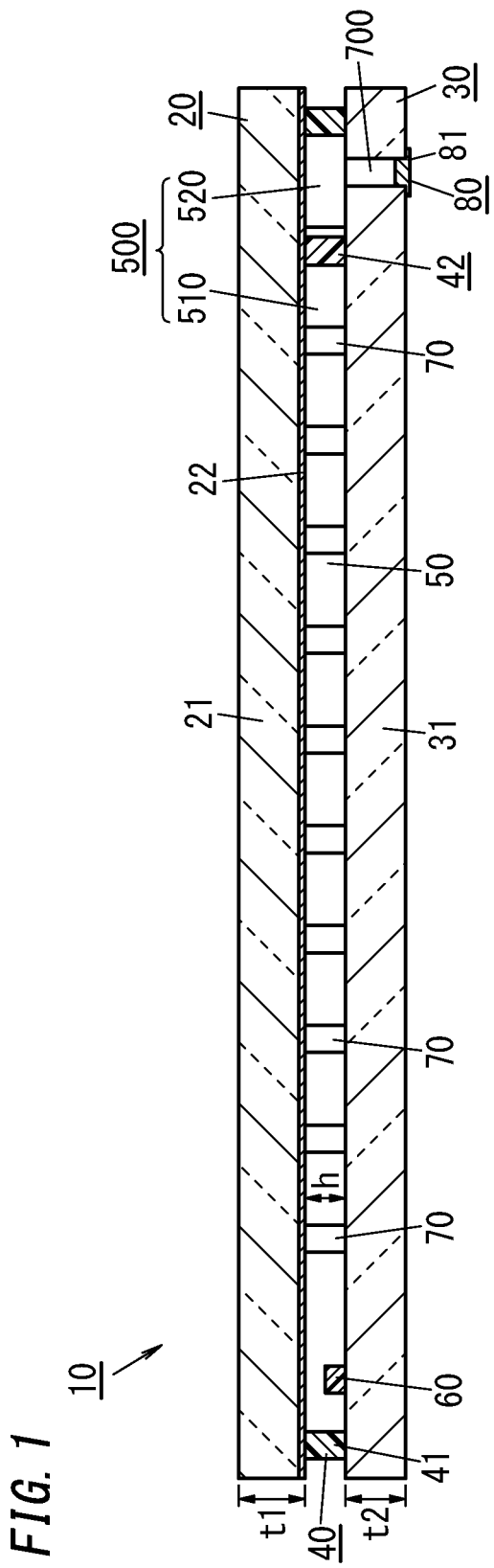
FIG. 1 is a cross-sectional view of a glass panel unit according to a first embodiment of the present disclosure.
Figure 2:
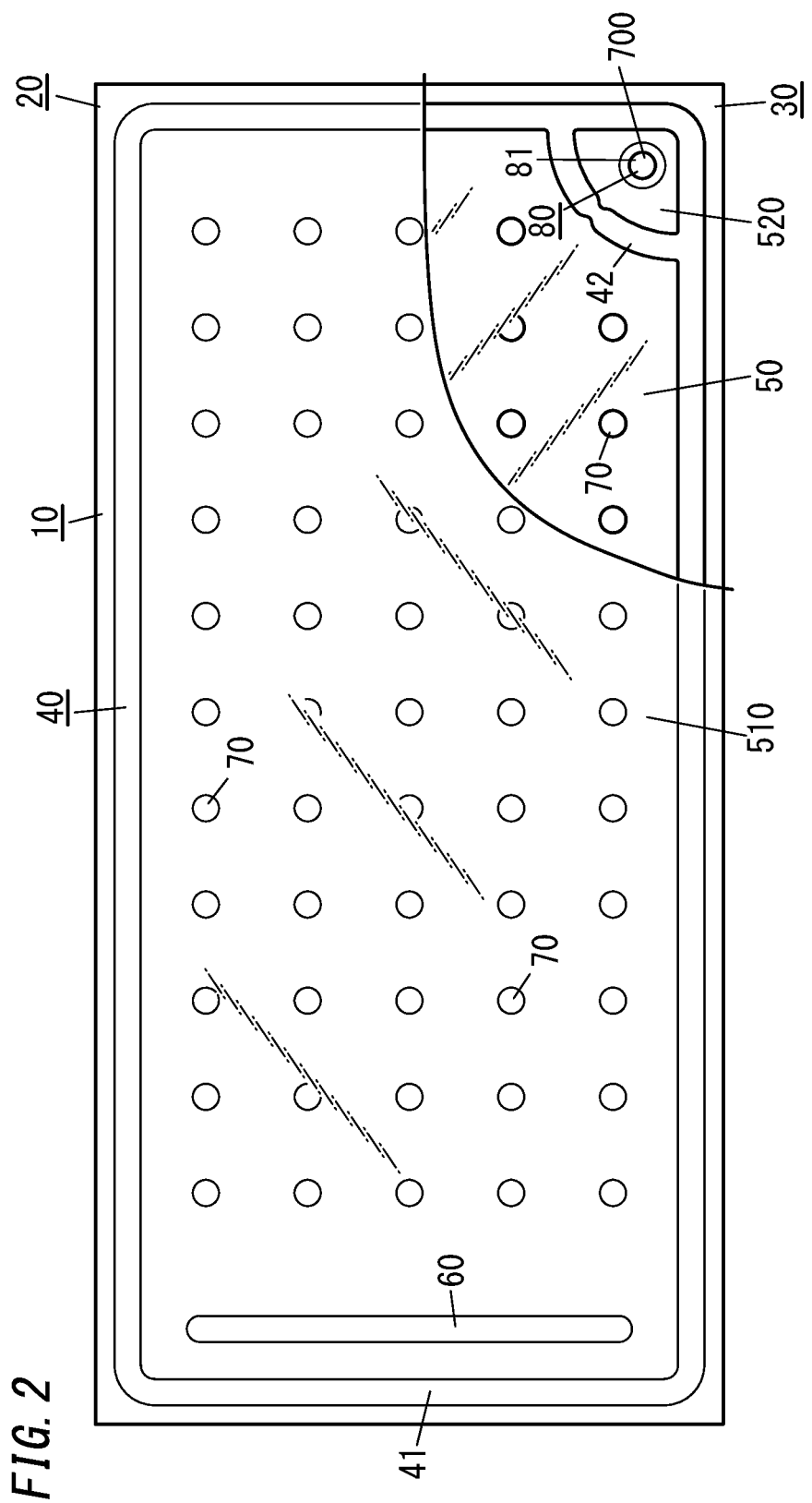
FIG. 2 is a partially cutaway plan view of the glass panel unit.

FIG. 1 and FIG. 2 illustrate a glass panel unit (a completed product of a glass panel unit) 10 according to the first embodiment. The glass panel unit 10 of the first embodiment is implemented as a vacuum insulating glass panel unit. The vacuum insulating glass panel unit is a type of multi-pane glazing including at least one pair of glass panels, and includes a vacuum space between the pair of glass panels.

The glass panel unit 10 of the first embodiment includes a first panel 20, a second panel 30, a seal 40, a vacuum space 50, a gas adsorbent 60, multiple pillars 70, and an occluding member 80.

Figure 3:
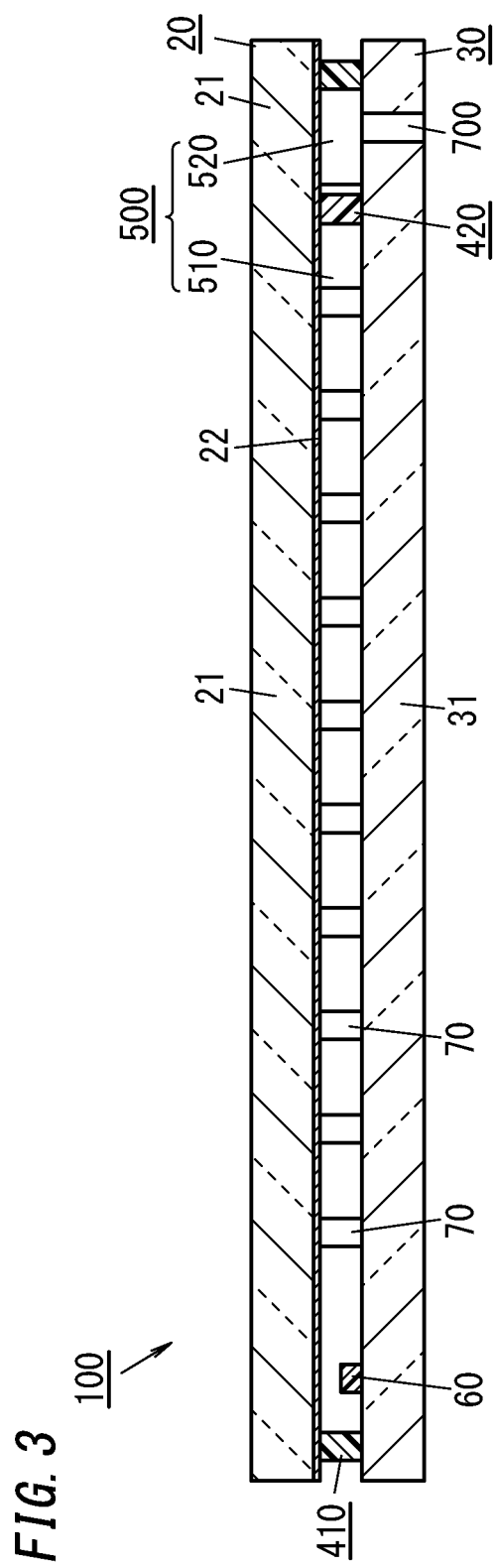
FIG. 3 is a cross-sectional view of a temporary assembly of the glass panel unit.
Figure 4:
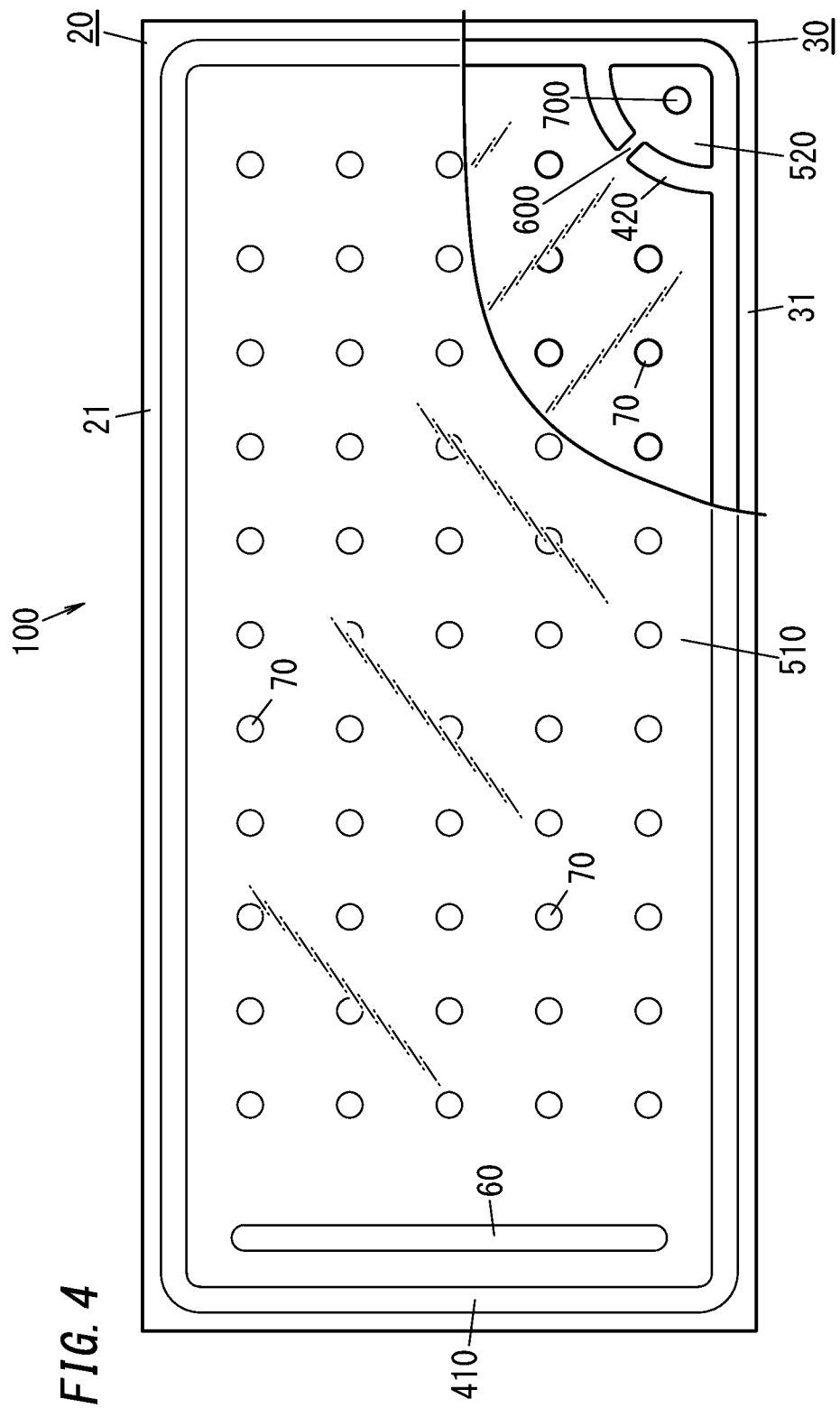
FIG. 4 is a partially cutaway schematic plan view of the temporary assembly of the glass panel unit.

The glass panel unit (completed product) 10 is obtained by subjecting a temporary assembly 100 shown in FIG. 3 and FIG. 4 to a predetermined process.

The temporary assembly 100 includes the first panel 20, the second panel 30, a frame 410, an internal space 500, a partition 420, a gas passage 600, an outlet 700, the gas adsorbent 60, and the multiple pillars 70 made of resin.

The first panel 20 includes a first glass plate 21 determining a plan shape of the first panel 20, and a coating 22.

The first glass plate 21 is a rectangular flat plate and includes a first face (lower face in FIG. 3) and a second face (upper face in FIG. 3), which are parallel to each other, on both sides in a direction of a thickness t1 (see FIG. 1) thereof. Each of the first face and the second face of the first glass plate 21 is a flat face. Examples of material of the first glass plate 21 may include soda lime glass, high strain point glass, chemically strengthened glass, non-alkaline glass, quartz glass, neoceram, and physically strengthened glass.

The coating 22 is formed on the first face of the first glass plate 21. The coating 22 is an infrared reflective film. Note that, the coating 22 is not limited to such an infrared reflective film but may be a film with desired physical properties. Alternatively, the first panel 20 may include the first glass plate 21 alone. In short, the first panel 20 includes at least the first glass plate 21.

The second panel 30 includes a second glass plate 31 determining a plan shape of the second panel 30. The second glass plate 31 is a rectangular flat plate and includes a first face (upper face in FIG. 3) and a second face (lower face in FIG. 3), which are parallel to each other, on both sides in a direction of a thickness t2 (see FIG. 1) thereof. Each of the first face and the second face of the second glass plate 31 is a flat face.

The second glass plate 31 has the same plan shape and plan size as the first glass plate 21 (in other words, the second panel 30 has the same plan shape as the first panel 20). Further, the second glass plate 31 has the thickness t2, which is a thickness t same as the thickness t1 of the first glass plate 21, for example (i.e., t=t1=t2). Examples of material of the second glass plate 31 may include soda lime glass, high strain point glass, chemically strengthened glass, non-alkaline glass, quartz glass, neoceram, and physically strengthened glass.

The second panel 30 includes the second glass plate 31 alone. In other words, the second glass plate 31 forms the second panel 30 by itself. Alternatively, the second panel 30 may further include a coating provided at either or both faces thereof. The coating may be a film with desired physical properties such as an infrared reflective film. In this case, the second panel 30 includes the second glass plate 31 and the coating. In short, the second panel 30 includes at least the second glass plate 31.

The second panel 30 is placed to face the first panel 20. In more detail, the first panel 20 and the second panel 30 are arranged so that the first face of the first glass plate 21 and the first face of the second glass plate 31 face and parallel to each other.

The frame 410 is placed between the first panel 20 and the second panel 30 to hermetically bond the first panel 20 and the second panel 30 together. Thereby, the internal space 500 enclosed by the frame 410, the first panel 20, and the second panel 30 is formed.

The frame 410 is formed of thermal adhesive (first thermal adhesive with a first softening point). Examples of the first thermal adhesive may include glass frit. Examples of the glass frit may include low-melting-point glass frit. Examples of the low-melting-point glass frit may include bismuth-based glass frit, lead-based glass frit, and vanadium-based glass frit.

The frame 410 has a rectangular frame shape. The frame 410 has the same plan shape as each of the first glass plate 21 and the second glass plate 31, but the frame 410 has a smaller plan size than each of the first glass plate 21 and the second glass plate 31. The frame 410 is formed to extend along an outer periphery of an upper face of the second panel 30 (the first face of the second glass plate 31). In other words, the frame 410 is formed to surrounds an almost entire region on the upper face of the second panel 30.

Figure 6:
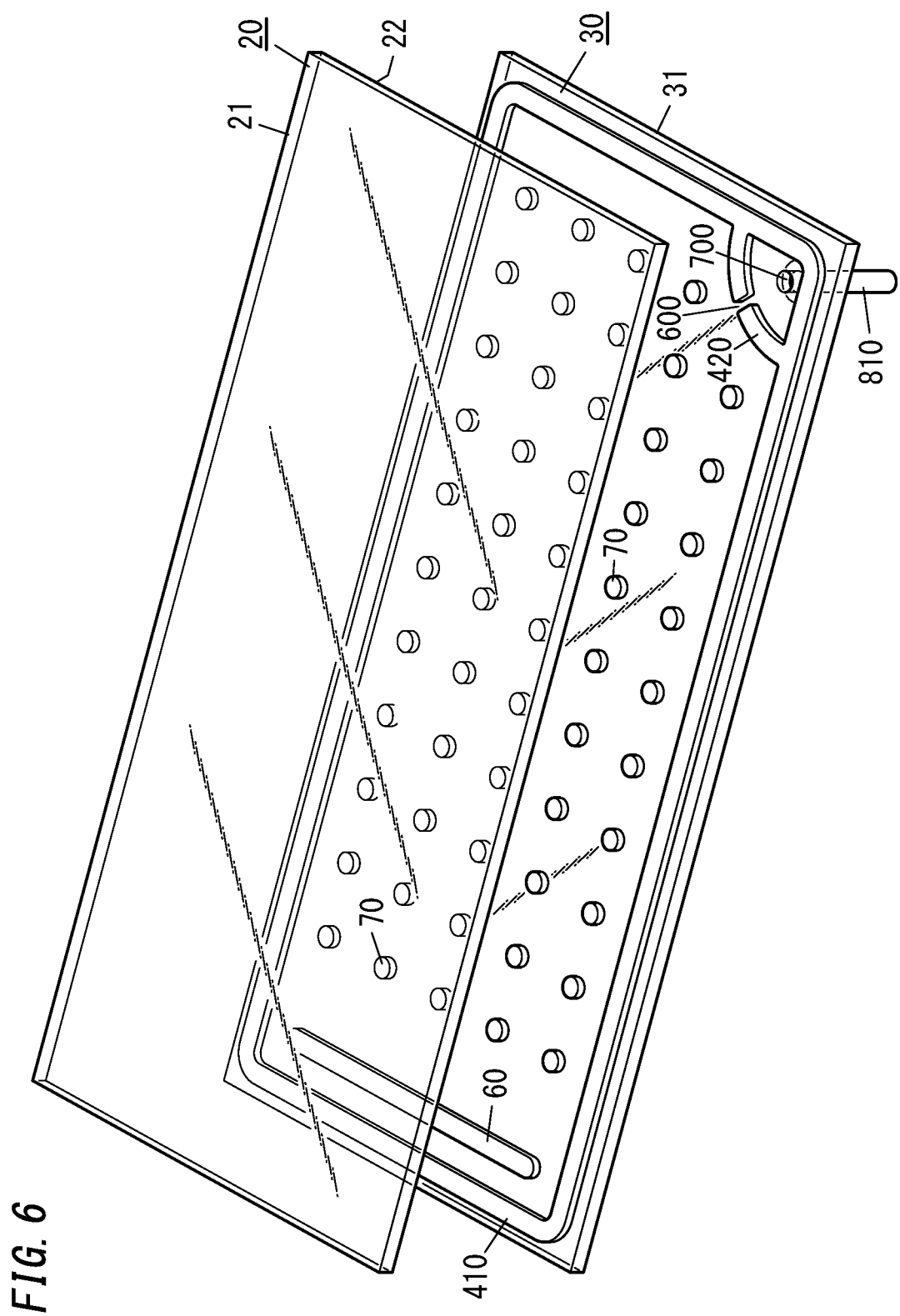
FIG. 6 is a perspective view for illustrating the method for manufacturing the glass panel unit.

The first panel 20 and the second panel 30 are hermetically bonded with the frame 410 by once melting the first thermal adhesive of the frame 410 at a predetermined temperature (first melting temperature) Tm1 (see FIG. 6) equal to or higher than the first softening point.

The partition 420 is placed inside the internal space 500. The partition 420 divides the internal space 500 into a first space 510 and a second space 520. The first space 510 is a space to be hermetically enclosed to form a vacuum space 50 while the glass panel unit 10 is produced, namely is a hermetically enclosed space. The second space 520 is a space communicated with the outlet 700, namely is an evacuation space. The partition 420 is formed between a first end (right end in FIG. 4) and a center of the second panel 30 in a lengthwise direction (left/right direction in FIG. 4) of the second panel 30 so that the first space 510 is larger than the second space 520.

The partition 420 is formed of thermal adhesive (second thermal adhesive with a second softening point). Examples of the second thermal adhesive may include glass frit. Examples of the glass frit may include low-melting-point glass frit. Examples of the low-melting-point glass frit may include bismuth-based glass frit, lead-based glass frit, and vanadium-based glass frit. The second thermal adhesive may be same as the first thermal adhesive, and the second softening point may be equal to the first softening point.

The outlet 700 is a hole interconnecting the second space 520 and an outside. The outlet 700 is used for evacuating the first space 510 by way of the second space 520 and the gas passage 600. The outlet 700 is formed in the second panel 30 to interconnect the second space 520 and the outside. In more detail, the outlet 700 is positioned in a corner of the second panel 30. The outlet 700 is formed in the second panel 30 in the first embodiment, but is not limited thereto. Alternatively, an outlet 700 may be formed in the first panel 20, or in each of the first panel 20 and the second panel 30.

The gas adsorbent 60 is placed inside the first space 510. In more detail, the gas adsorbent 60 has an elongated shape, and is formed on a second end (left end in FIG. 4) in the lengthwise direction of the second panel 30 to extend along the width direction of the second panel 30. In summary, the gas adsorbent 60 is placed on one end of the first space 510 (the vacuum space 50). According to this arrangement, the gas adsorbent 60 can be unlikely to be perceived. Further, the gas adsorbent 60 is positioned away from the partition 420 and the gas passage 600. Hence, it is possible to lower a probability that the gas adsorbent 60 prevents evacuation of the first space 510.

The gas adsorbent 60 is used to adsorb unnecessary gas (for example, residual gas). The unnecessary gas may include gas emitted from the frame 410 and the partition 420 when heated.

The gas adsorbent 60 includes a getter. The getter is a substance having properties of adsorbing molecules smaller than a predetermined size. The getter may be an evaporative getter. The evaporative getter has properties of desorbing adsorbed molecules when having a temperature equal to or higher than a predetermined temperature (activation temperature). Therefore, even if the adsorbability of the evaporative getter has been decreased, the adsorbability of the evaporative getter can be recovered by heating the evaporative getter to a temperature equal to or higher than the activation temperature. Examples of the evaporative getter may include zeolite and ion-exchanged zeolite (for example, copper ion-exchanged zeolite).

The gas adsorbent 60 includes a powder of this getter. In more detail, the gas adsorbent 60 may be formed by applying a liquid containing a dispersed powder of the getter. In this case, the gas adsorbent 60 can be downsized. Therefore, the gas adsorbent 60 can be placed even if the vacuum space 50 is small.

The multiple pillars 70 are used to keep an interval between the first panel 20 and the second panel 30 at a predetermined interval h (see FIG. 1). In other words, the multiple pillars 70 serve as spacers to keep a distance between the first panel 20 and the second panel 30 to a desired value.

The multiple pillars 70 are arranged inside the first space 510. In more detail, the multiple pillars 70 are arranged at individual intersections of a square or rectangular lattice of constant lattice intervals including a pitch p (see FIG. 12). In the first embodiment, the multiple pillars 70 are arranged at individual intersections of a square lattice having longitudinal intervals and lateral intervals equal to the pitch p. Alternatively, the lateral intervals of the lattice may be longer than or shorter than the pitch p while the longitudinal intervals be equal to the pitch p. Further alternatively, the longitudinal intervals may be longer than or shorter than the pitch p while the lateral intervals be equal to the pitch p.

Each pillar 70 is made of light-transmissive material. Note that, each pillar 70 may be made of opaque material, providing that it is sufficiently small. Material of the pillars 70 is selected so that deformation of the pillars 70 does not occur during a first melting step, an evacuating step, and a second melting step which are described later. For example, the material of the pillars 70 is selected to have a softening point (softening temperature) higher than the first softening point of the first thermal adhesive and the second softening point of the second thermal adhesive.

The first embodiment is characterized in the intervals of the pillars 70, which is described hereinafter.

Figure 12:
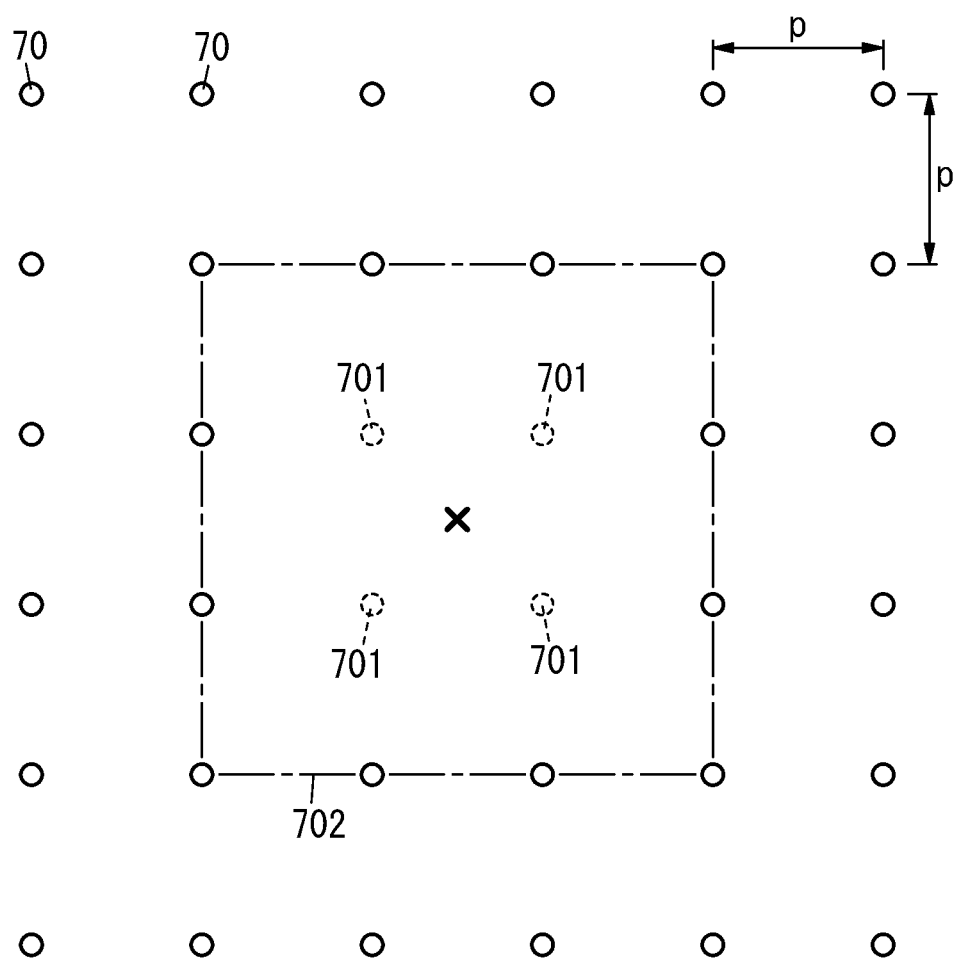
FIG. 12 is a plan view of a part, where pillars are arranged, of a glass panel unit for illustrating principle of distortion of the glass panel unit.
Figure 13A:
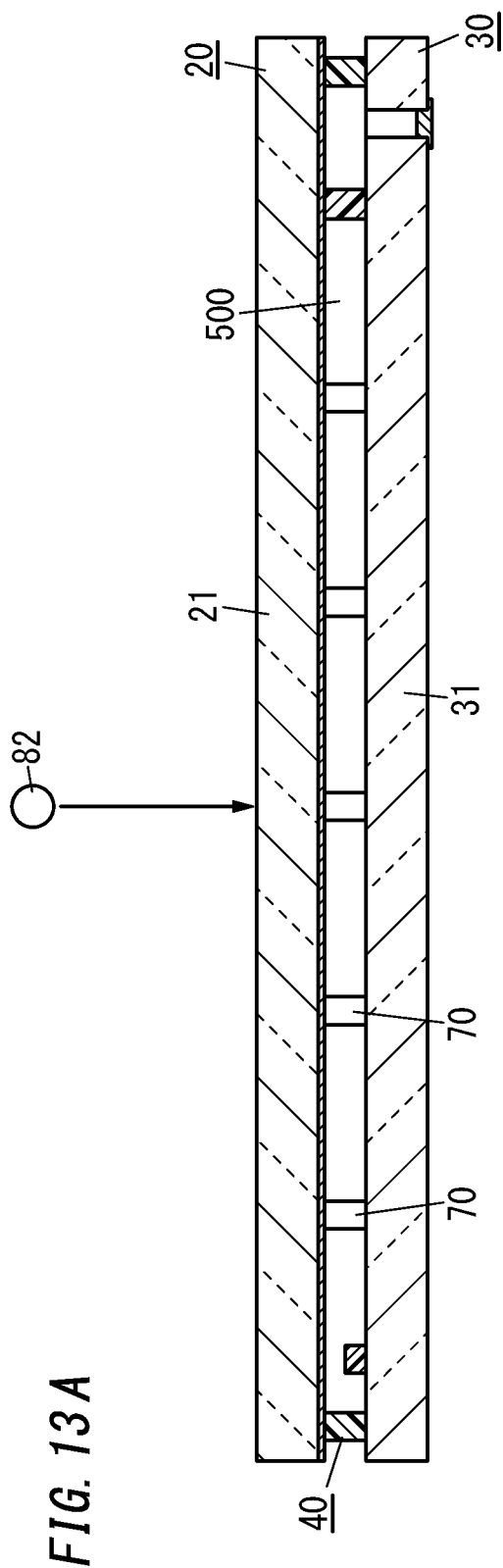
FIG. 13A is a cross-sectional view of a glass panel unit subject to an impact force from a steel ball colliding at a position where a pillar exists.
Figure 13B:
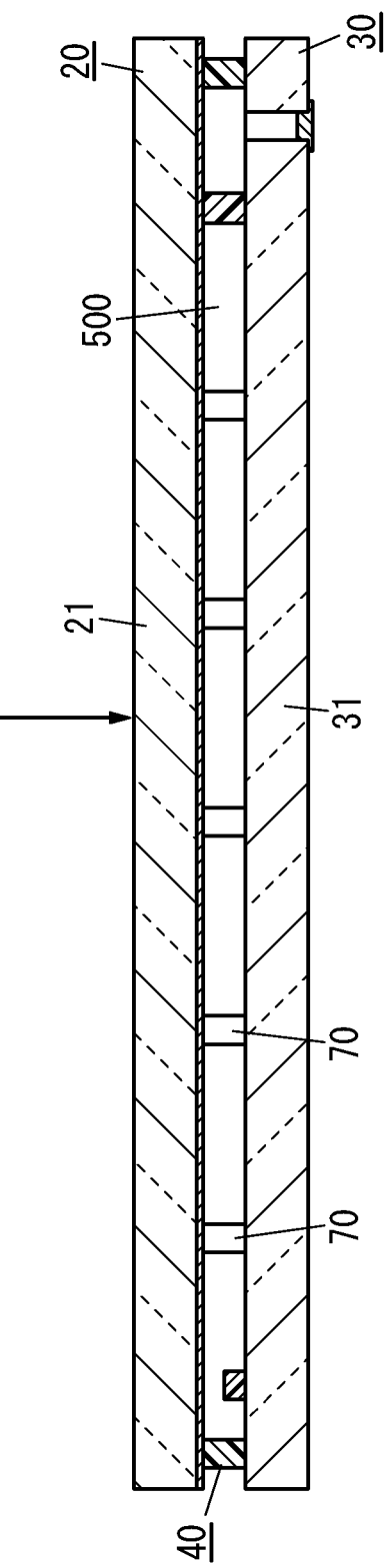
FIG. 13B is a cross-sectional view of a glass panel unit subject to an impact force from a steel ball colliding at a position between adjacent pillars.

As shown in FIG. 12, the pillars 70 are placed at individual intersections of a square or rectangular lattice having a pitch p (m). Let consider a case where four pillars 701, which are respectively placed at four vertexes of a center square whose length of each side equals to the pitch p, are to be broken. In this case, further providing that four sides of a square 702 (length of each side a=3·p) defined by twelve pillars 70 surrounding the above four pillars 701 are fixed, either the first panel 20 or the second panel 30 has a distortion δ (m) at its center (a position where the symbol "x" is drawn in the figure), which is expressed by a (formula 1) below.

$$\delta = \alpha \cdot P \cdot a^2 / D \quad \text{(formula 1)}$$

Where P (N) denotes a load, D (N·m) denotes flexural rigidity of each of the first panel 20 and the second panel 30, and α is a coefficient depending on a condition of the load.

The flexural rigidity D is expressed by a (formula 2) below.

$$D = \frac{Eg \cdot t^3}{12(1 - v^2)} \quad \text{(formula 2)}$$

Where Eg (Pa) denotes Young's modulus of each of the first panel 20 and the second panel 30, t (m) denotes the thickness of each of the first panel 20 and the second panel 30 described above, ν denotes Poisson's ratio of each of the first panel 20 and the second panel 30.

In a case where the load is a concentric load, $\alpha=\alpha_1$ (=0.00560), and the distortion $\delta_1$ is expressed by a (formula 3) below.

$$\delta_1 = \alpha_1 \cdot P \cdot a^2/D \qquad \text{(formula 3)}$$

In a case where the load is an uniformly distributed load, $\alpha=\alpha_2$(=0.00126), and the load P is expressed by a (formula 4) below.

$$P = w \cdot a^2 \qquad \text{(formula 4)}$$

Where w (Pa) denotes the pressure (atmospheric pressure). The distortion $\delta_2$ caused by the uniformly distributed load is expressed by a (formula 5) below.

$$\delta_2 = \alpha_2 \cdot w \cdot a^2 \cdot a^2/D \qquad \text{(formula 5)}$$

In this context, a total distortion $\delta$ (m), which is a sum of the distortion of the first panel 20 and the distortion of the second panel 30, is expressed by a (formula 6) below.

$$\delta = \delta_1 + \delta_2 \cdot 2 \qquad \text{(formula 6)}$$

Because the concentric load acts on the first panel 20 only, and the uniformly distributed load from the atmospheric pressure acts on both of the first panel 20 and the second panel 30, solely the distortion $\delta_2$ is multiplied by "2" in the (formula 6).

Substitute the (formula 3) and the (formula 5) in the (formula 6) to obtain a (formula 7).

$$\delta = (\alpha_1 \cdot P + 2 \cdot \alpha_2 \cdot w \cdot a^2) \cdot a^2/D \qquad \text{(formula 7)}$$

Let denote $P_1$(N) as a real load loading compression fracture, which is defined as a margin per one pillar 70 until the load acting on the pillar 70 reaches a load loading compression fracture, $P_1$ can be expressed by a (formula 8) below, where $P_0$ (N) denotes a load loading compression fracture per one pillar 70, and $w \cdot p^2$ expresses the atmospheric pressure acting on one pillar 70.

$$P_1 = P_0 - w \cdot p^2 \qquad \text{(formula 8)}$$

Substitute the above mentioned formula $a = 3 \cdot p$ in the (formula 7) and assume that the concentric load P acting the first panel 20 alone equals to the real load loading compression fracture $P_1$ acting on the four pillars 70 to obtain an (formula 9), which expresses the distortion $\delta$ of the glass panel unit when the glass panel unit receives a theoretical minimum concentric load causing the breakage of the four pillars 70, which is theoretically determined minimum concentric load that can cause the breakage of the four pillars 70.

$$\delta = (\alpha_1 \cdot 4 \cdot P_1 + 2 \cdot \alpha_2 \cdot w \cdot 9 \cdot p^2) \cdot 9 \cdot p^2/D \qquad \text{(formula 9)}$$

Rearrange the (formula 9) to obtain a (formula 10) below.

$$\delta = 9 \cdot \{4 \cdot \alpha_1 \cdot P_0 + (18 \cdot \alpha_1 - 4 \cdot \alpha_2) \cdot w \cdot p^2\} \cdot p^2/D \qquad \text{(formula 10)}$$

Substitute the equations $\alpha_1 = 0.00560$ and $\alpha_2 = 0.00126$ in the (formula 10) to obtain a (formula 11) below.

$$\delta = (0.2016 \cdot P_0 + 0.00252 \cdot w \cdot p^2) \cdot p^2/D \qquad \text{(formula 11)}$$

In case a relation $0.2016 \cdot P_0 \gg 0.00252 \cdot w \cdot p^2$ is satisfied and thus the term $0.00252 \cdot w \cdot p^2$ can be substantially ignored, the (formula 11) can be approximated to a (formula 12) below.

$$\delta = 0.2016 \cdot P_0 \cdot p^2/D \qquad \text{(formula 12)}$$

The (formula 12) is a model formula of an ideal case where each length of four sides of the rectangle are fixed to α (m), but in an actual glass panel unit the pillars 70 are disposed discretely. Thus the (formula 12) is corrected by a correction coefficient K to obtain a (formula 13) below.

$$\delta = K \cdot 0.2016 \cdot P_0 \cdot p^2/D \qquad \text{(formula 13)}$$

The correction coefficient K satisfies the relation $1.15 \leq K \leq 1.71$, which is determined according to some experiments. Substitute the equation $K=1.15$ in this formula to obtain a (formula 14) below.

$$\delta = 0.232 \cdot P_0 \cdot p^2/D \qquad \text{(formula 14)}$$

Providing that the total distortion $\delta$, obtained by adding the distortion of the first panel 20 and the distortion of the second panel 30, is smaller than an interval h between the first panel 20 and the second panel 30, then the first panel 20 does not make contact with the second panel 30. Therefore, providing that the glass panel unit satisfies a (formula 15) below, the first panel 20 and the second panel 30 do not make contact with each other even when the glass panel unit receives the theoretical minimum concentric load causing the breakage of the four pillars 70.

$$h - 232 \cdot P_0 \cdot p^2/D > 0 \qquad \text{(formula 15)}$$

That is, the glass panel unit satisfying the (formula 15) can reduce the probability of damaging the first panel 20 or the second panel 30, because the first panel 20 and the second panel 30 are less likely to make contact with each other even when the glass panel unit receives the theoretical minimum concentric load causing the breakage of the four pillars 70.

Experiments 1 to 3 were performed in order to confirm the validity of the (formula 15).

In the experiments 1 to 3, a steel ball 82 having a weight of 227 (g) was fallen on the first panel 20 at an intermediate positon between two pillars 70, and it was measured a minimum height (hereinafter, referred to as a "breaking ball height") of the steel ball 82 at which at least one of the first panel 20 and the second panel 30 was broken. An average value of the breaking ball height was used for evaluation. It can be understood that a higher breaking ball height indicates a better resistance to the impact.

Table 1 shows experimental conditions, a breaking ball height, and a value obtained by a discriminating expression, according to each of the experiment 1 and comparative experiments 11 to 15.

Note that the discriminating expression is expressed by the left member of the (formula 15).

Further, the height of the pillar 70 equals to the interval h between the first panel 20 and the second panel 30.

The first panel 20 and the second panel 30 are assumed to have same physical quantities, and the "Glass Panel" in the table indicates each of the first panel 20 and the second panel 30.

TABLE 1

| | Experiment 1 | Comparative Experiment 11 | Comparative Experiment 12 | Comparative Experiment 13 | Comparative Experiment 14 | Comparative Experiment 15 |
|---|---|---|---|---|---|---|
| Material of Spacer | Resin | SUS304 | SUS304 | SUS304 | Resin | Resin |
| Spacer Height h(μm) | 120 | 100 | 150 | 200 | 60 | 80 |
| Spacer Diameter r(μm) | 500 | 400 | 400 | 400 | 500 | 500 |
| Load Loading Compression Fracture of Spacer P(N) | 120 | 200 | 200 | 200 | 120 | 120 |
| Spacer Pitch p(mm) | 20 | 20 | 20 | 20 | 20 | 20 |
| Thickness of Glass Panel t(mm) | 2.8 | 2.8 | 2.8 | 2.8 | 2.8 | 2.8 |
| Young's Modulus of Glass Panel Eg(MPa) | 76000 | 76000 | 76000 | 76000 | 76000 | 76000 |
| Poisson's Ratio of Glass Panel ν | 0.23 | 0.23 | 0.23 | 0.23 | 0.23 | 0.23 |
| Discriminating Expression | 40 | −34 | 16 | 66 | −21 | −1 |
| Breaking Ball Height (cm) | 45 | 12.5 | 12.5 | 15 | 30 | 30 |

According to the glass panel unit for the experiment 1, the value obtained by the discriminating expression was 40 which was significantly beyond 0, and the breaking ball height was 45 (cm), concluded to be excellent.

The value obtained by the discriminating expression according to the glass panel unit for each of the comparative experiment 11, the comparative experiment 14 and the comparative experiment 15 was negative and thus these glass panel units did not satisfy the (formula 15). Furthermore, the breaking ball heights of them were far inferior to that (45 (cm)) of the experiment 1. According to the glass panel unit for the comparative experiment 12, the value obtained by the discriminating expression was 16, which was slightly larger than 0, but the breaking ball height thereof was 12.5 (cm), which was far inferior to that of the experiment 1. According to the glass panel unit for the comparative experiment 13, the value obtained by the discriminating expression was 66, which was significantly beyond 0, but the breaking ball height thereof was 15 (cm), which was far inferior to that of the experiment 1.

The glass panel units for the comparative experiments 11 to 13 include pillars 70 made of SUS304. According to the comparative experiments 11 to 13, it was found that the first panel 20 and/or the second panel 30 was broken at a position where the pillar 70 is provided. This can be considered that the glass panel unit according to these comparative experiments was broken due to a mechanism different from the contact between the first panel 20 and the second panel 30. According to these results, it can be concluded that the (formula 15) may be valid for the glass panel including the pillars 70 made of resin, rather than the glass panel including the pillars 70 made of SUS304.

Table 2 shows experimental conditions, a breaking ball height, and a value obtained by the discriminating expression, according to each of the experiment 2 and comparative experiments 21 to 23.

TABLE 2

| | Experiment 2 | Comparative Experiment 21 | Comparative Experiment 22 | Comparative Experiment 23 |
|---|---|---|---|---|
| Material of Spacer | Resin | SUS304 | SUS304 | Resin |
| Spacer Height h(μm) | 80 | 150 | 150 | 80 |
| Spacer Diameter r(μm) | 500 | 400 | 400 | 500 |
| Load Loading Compression Fracture of Spacer P(N) | 120 | 200 | 200 | 120 |
| Spacer Pitch p(mm) | 20 | 20 | 20 | 20 |
| Thickness of Glass Panel t(mm) | 3.8 | 1.8 | 2.8 | 2.8 |
| Young's Modulus of Glass Panel Eg(MPa) | 76000 | 76000 | 76000 | 76000 |
| Poisson's Ratio of Glass Panel ν | 0.23 | 0.23 | 0.23 | 0.23 |
| Discriminating Expression | 48 | −355 | 16 | −1 |
| Breaking Ball Height (cm) | 37.5 | 15 | 15 | 30 |

According to the glass panel unit for the experiment 2, the value obtained by the discriminating expression was 48 which was significantly beyond 0, and the breaking ball height was 37.5 (cm), concluded to be excellent.

The value obtained by the discriminating expression according to the glass panel unit for each of the comparative experiment 21 and the comparative experiment 23 was negative and thus these glass panel units did not satisfy the (formula 15). Furthermore, the breaking ball heights of them were far inferior to that (37.5 (cm)) of the experiment 2. According to the glass panel unit for the comparative experiment 22, the value obtained by the discriminating expression was 16, which was slightly larger than 0, but the breaking ball height thereof was far inferior to that (37.5 (cm)) of the experiment 2.

Table 3 shows experimental conditions, a breaking ball height, and a value obtained by the discriminating expression, according to each of the experiment 3 and comparative experiments 31 to 33.

TABLE 3

| | Experiment 3 | Comparative Experiment 31 | Comparative Experiment 32 | Comparative Experiment 33 |
|---|---|---|---|---|
| Material of Spacer | Resin | SUS304 | SUS304 | Resin |
| Spacer Height h(μm) | 80 | 150 | 150 | 80 |
| Spacer Diameter r(μm) | 500 | 400 | 400 | 500 |
| Load Loading Compression Fracture of Spacer P(N) | 120 | 200 | 200 | 120 |
| Spacer Pitch p(mm) | 14 | 28 | 20 | 20 |
| Thickness of Glass Panel t(mm) | 2.8 | 2.8 | 3.8 | 2.8 |
| Young's Modulus of Glass Panel Eg(MPa) | 76000 | 76000 | 76000 | 76000 |
| Poisson's Ratio of Glass Panel ν | 0.23 | 0.23 | 0.23 | 0.23 |
| Discriminating Expression | 41 | −133 | 16 | −1 |
| Breaking Ball Height (cm) | 50 | 15 | 12.5 | 30 |

According to the glass panel unit for the experiment 3, the value obtained by the discriminating expression was 41 which was significantly beyond 0, and the breaking ball height was 50 (cm), concluded to be excellent.

The value obtained by the discriminating expression according to the glass panel unit for each of the comparative experiment 31 and the comparative experiment 33 was negative and thus these glass panel units did not satisfy the (formula 15). Furthermore, the breaking ball heights of them were far inferior to that (50 (cm)) of the experiment 3. According to the glass panel unit for the comparative experiment 32, the value obtained by the discriminating expression was 16, which was slightly larger than 0, but the breaking ball height thereof was far inferior to that (59 (cm)) of the experiment 3.

Next explained is a formula which can provide improved accuracy. This formula is obtained in consideration with elastic deformation of twelve pillars 70 that are arranged to surround the four pillars 70 to be broken when the glass panel unit receives the theoretical minimum concentric load causing the breakage of the four pillars 70. The deformation (compression) δsq (m) caused in each of the twelve pillars 70 can be calculated based on a load acting on one pillar obtained by dispersing the above theoretical minimum concentric load causing the breakage of the four pillars 70 and by dispersing the uniformly distributed load acting on these four pillars 70, and can be expressed by the (formula 16) below.

$$\delta sq = \frac{4 \cdot P_1 + w \cdot 4 \cdot p^2}{12 \cdot Esp \cdot \pi \cdot r^2} \quad \text{(formula 16)}$$

Where Esp (Pa) denotes the Young's modulus of the pillar 70, r (m) denotes the radius of the pillar 70, and π is the mathematical constant (circle ratio).

Substitute the (formula 9) in this formula and rearrange the resultant formula to obtain a (formula 17) below.

$$\delta sq = \frac{P_0}{3 \cdot Esp \cdot \pi \cdot r^2} \quad \text{(formula 17)}$$

The δsq is subtracted from the left member of the (formula 15) to obtain a (formula 18) below.

$$h - 0.232 \cdot P_0 \cdot p^2 / D - \frac{P_0}{3 \cdot Esp \cdot \pi \cdot r^2} > 0 \quad \text{(formula 18)}$$

Note that the term "π·r²" indicates the cross-section area S (m²) of the pillar 70, and, in case the pillar 70 is not circular shape, may be replaced with a cross-sectional area S thereof.

The aforementioned temporary assembly 100 is subjected to the above predetermined process to obtain the completed assembly 110.

The above predetermined process includes converting the first space 510 into the vacuum space 50 by evacuating the first space 510 by way of an evacuation passage capable of evacuating gas to an outside at a predetermined temperature (an evacuation temperature) Te. The evacuation passage includes the gas passage 600, the second space 520, and the outlet 700. The evacuation temperature Te is higher than the activation temperature of the getter of the gas adsorbent 60. Consequently, evacuation of the first space 510 and recovery of the adsorbability of the getter can be performed simultaneously.

The above predetermined process further includes forming the seal 40 enclosing the vacuum space 50 by forming a separator 42 for closing the gas passage 600 by changing a shape of the partition 420, as shown in FIG. 2. The partition 420 includes the second thermal adhesive. Therefore, the separator 42 can be formed by changing the shape of the partition 420 by once melting the second thermal adhesive at a predetermined temperature (a second melting temperature) Tm2 (see FIG. 7) equal to or higher than the second softening point. Note that, the first melting temperature Tm1 is lower than the second melting temperature Tm2. Consequently, it is possible to prevent the gas passage 600 from being closed due to deformation of the partition 420 in bonding the first panel 20 and the second panel 30 with the frame 410.

The partition 420 is changed in shape so that the second gas passage 620 is closed as shown in FIG. 2. The separator 42, which is obtained by changing the shape of the partition 420, separates (spatially) the vacuum space 50 from the second space 520. The separator (second part) 42 and part (first part) 41 of the frame 410 corresponding to the vacuum space 50 constitute the seal 40 enclosing the vacuum space 50.

The glass panel unit (completed product) 10 obtained in the aforementioned manner includes, as shown in FIG. 2, the first panel 20, the second panel 30, the seal 40, the vacuum space 50, the second space 520, the gas adsorbent 60, the multiple pillars 70, and the occluding member 80.

The vacuum space 50 is obtained by evacuating the first space 510 by way of the second space 520 and the outlet 700 as described above. In other words, the vacuum space 50 is defined as the first space 510 with a degree of vacuum equal to or lower than a predetermined value. The predetermined value may be 0.1 Pa, for example. The vacuum space 50 is hermetically enclosed by the first panel 20, the second panel 30, and the seal 40 completely and thus is separated from the second space 520 and the outlet 700.

The seal 40 encloses the vacuum space 50 completely and bonds the first panel 20 and the second panel 30 to each other hermetically. The seal 40 has a frame shape, and includes the first part 41 and the second part 42. The first part 41 is part of the frame 410 corresponding to the vacuum space 50. In other words, the first part 41 is part of the frame 410 facing the vacuum space 50. The second part 42 is a separator formed by changing the shape of the partition 420.

The occluding member 80 lowers the probability of foreign objects such as dusts entering the second space 520 through the outlet 700. In the first embodiment, the occluding member 80 includes a cover 81 provided on a front side of the outlet 700 formed in the first panel 20 or the second panel 30.

Such an occluding member 80 provided to the outlet 700 can prevent the foreign objects such as the dust from entering the second space 520 through the outlet 700. This can prevent the visual quality of the glass panel unit 10 from being deteriorated due to the foreign object entering the second space 520 through the outlet 700. Note that the occluding member 80 may be an optional element and may be omitted.

Hereinafter, a method for manufacturing the glass panel unit 10 of the first embodiment is described with reference to FIG. 5 to FIG. 8.

The method for manufacturing the glass panel unit 10 of the first embodiment includes a preparation step, an assembling step, a hermetically enclosing step, and a removing step. Note that, the preparation step can be omitted.

The preparation step is a step of forming the first panel 20, the second panel 30, the frame 410, the partition 420, the internal space 500, the gas passage 600, the outlet 700, and the gas adsorbent 60, for the purpose of producing the temporary assembly 100. The preparation step includes first to sixth steps. Note that, the order of the second to sixth steps may be modified.

The first step is a step (substrate formation step) of forming the first panel 20 and the second panel 30. For example, in the first step, the first panel 20 and the second panel 30 are produced. The first step may include cleaning the first panel 20 and the second panel 30 if necessary.

The second step is a step of forming the outlet 700. In the second step, the outlet 700 is formed in the second panel 30. Further, in the second step, the second panel 30 is cleaned if necessary.

The third step is a step (sealing material formation step) of forming the frame 410 and the partition 420. In the third step, the material (the first thermal adhesive) of the frame 410 and the material (the second thermal adhesive) of the partition 420 are applied on to the second panel 30 (the first face of the second glass plate 31) with a dispenser or the like.

The material of the frame 410 and the material of the partition 420 are dried and calcined. For example, the second panel 30 where the material of the frame 410 and the material of the partition 420 are applied is heated. Note that, the first panel 20 may be heated together with the second panel 30. In other words, the first panel 20 may be heated under the same condition as the second panel 30. By doing so, it is possible to reduce a difference in degree of warp between the first panel 20 and the second panel 30.

The fourth step is a step (pillar formation step) of forming the pillars 70. The fourth step may include placing the multiple pillars 70 in individual predetermined locations on the second panel 30 with a chip mounter. Note that, the multiple pillars 70 are formed in advance. Alternatively, the multiple pillars 70 may be formed by use of photolithography techniques and etching techniques. In this case, the multiple pillars 70 may be made of photocurable material or the like. Alternatively, the multiple pillars 70 may be formed by use of known thin film formation techniques.

In the pillar formation step, the multiple pillars 70 are arranged to satisfy the above (formula 15) or (formula 18). As mentioned above, the (formula 15) is obtained without consideration with the elastic deformation of the pillars 70, and the (formula 18) is obtained in consideration with the elastic deformation of the pillars 70.

The fifth step is a step (gas adsorbent formation step) of forming the gas adsorbent 60. In the fifth step, a solution where a power of the getter is dispersed is applied to a predetermined location on the second panel 30 and then dried to thereby form the gas adsorbent 60.

Figure 5:
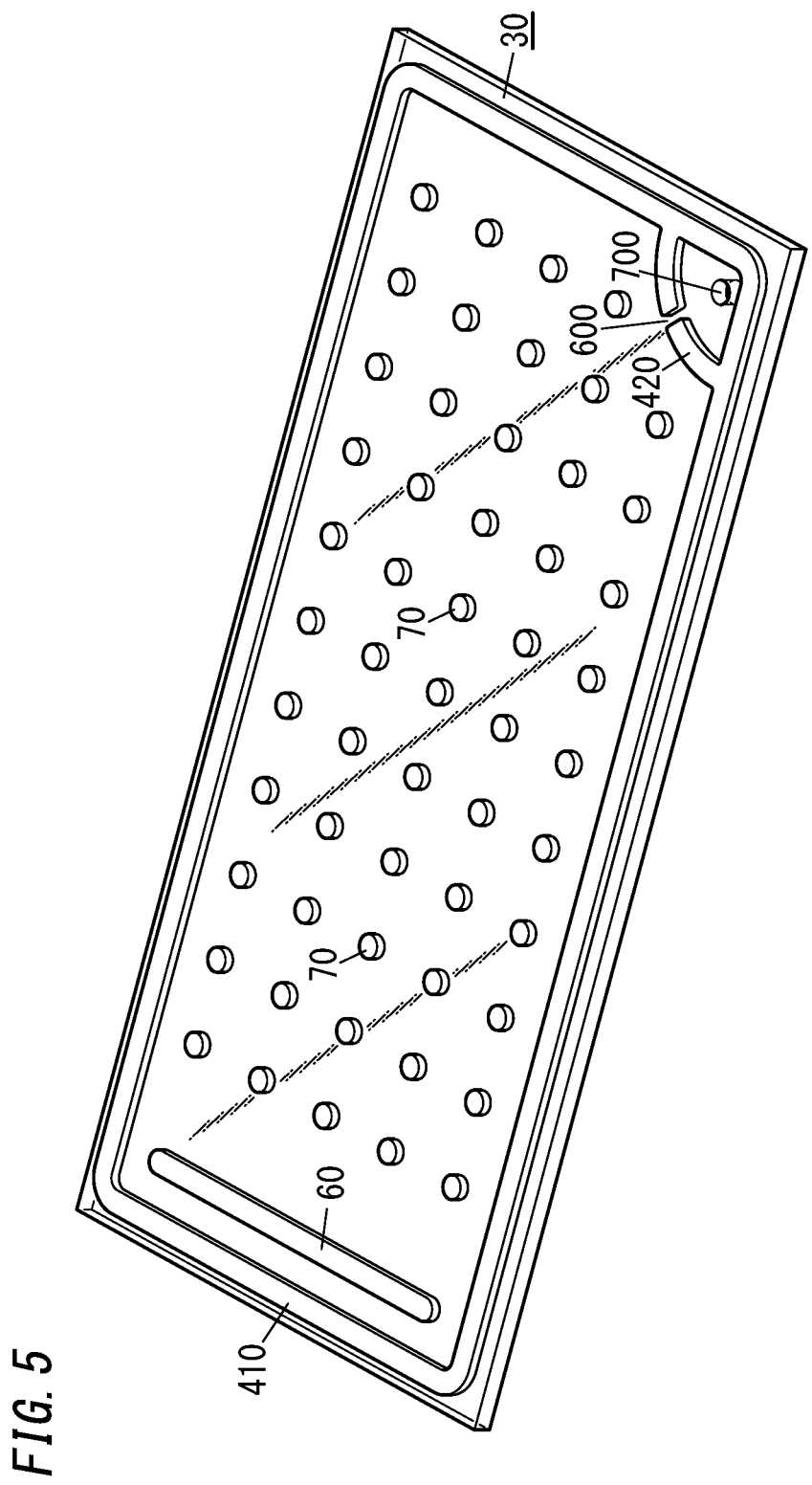
FIG. 5 is a perspective view for illustrating a method for manufacturing the glass panel unit.

When a process from the first step to the fifth step is completed, the second panel 30 is obtained, on which the frame 410, the partition 420, the gas passage 600, the outlet 700, the gas adsorbent 60, and the multiple pillars 70 are formed as shown in FIG. 5.

The sixth step is a step (placing step) of placing the first panel 20 and the second panel 30. In the sixth step, the first panel 20 and the second panel 30 are placed so that the first face of the first glass plate 21 and the first face of the second glass plate 31 face and are parallel to each other.

The assembling step is a step of preparing the temporary assembly 100. In more detail, in the assembling step, the temporary assembly 100 is prepared by bonding the first panel 20 and the second panel 30 together. In other words, the assembling step may be referred to as a step (first melting step) of hermetically bonding the first panel 20 and the second panel 30 together with the frame 410.

Figure 7:
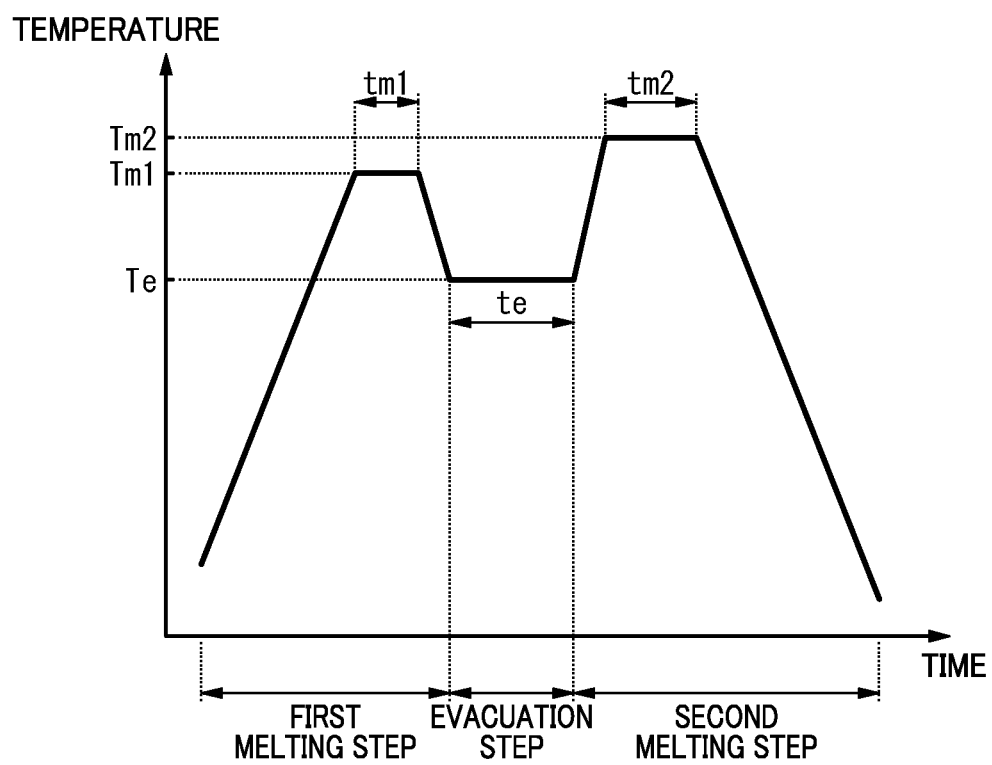
FIG. 7 is a time-temperature graph for illustrating the method for manufacturing the glass panel unit.

In the first melting step, the first thermal adhesive is melted once at the predetermined temperature (the first melting temperature) Tm1 equal to or higher than the first softening point and thereby the first panel 20 and the second panel 30 are hermetically bonded together. In more detail, the first panel 20 and the second panel 30 are placed in a furnace and heated at the first melting temperature Tm1 for a predetermined time (the first melting time) tm1, as shown in FIG. 7.

The first melting temperature Tm1 and the first melting time tm1 are selected so that the first panel 20 and the second panel 30 are hermetically bonded together with the thermal adhesive of the frame 410 but the gas passage 600 is not closed by the partition 420. In other words, a lower limit of the first melting temperature Tm1 is equal to the first softening point, and an upper limit of the first melting temperature Tm1 is however selected so as not to cause the partition 420 to close the gas passage 600. For example, when the first softening point and the second softening point are 434° C., the first melting temperature Tm1 is set to 440° C. Further, the first melting time tm1 may be 10 minutes, for example. Note that, in the first melting step, the frame 410 may emit gas. However such gas can be adsorbed by the gas adsorbent 60.

Figure 8:
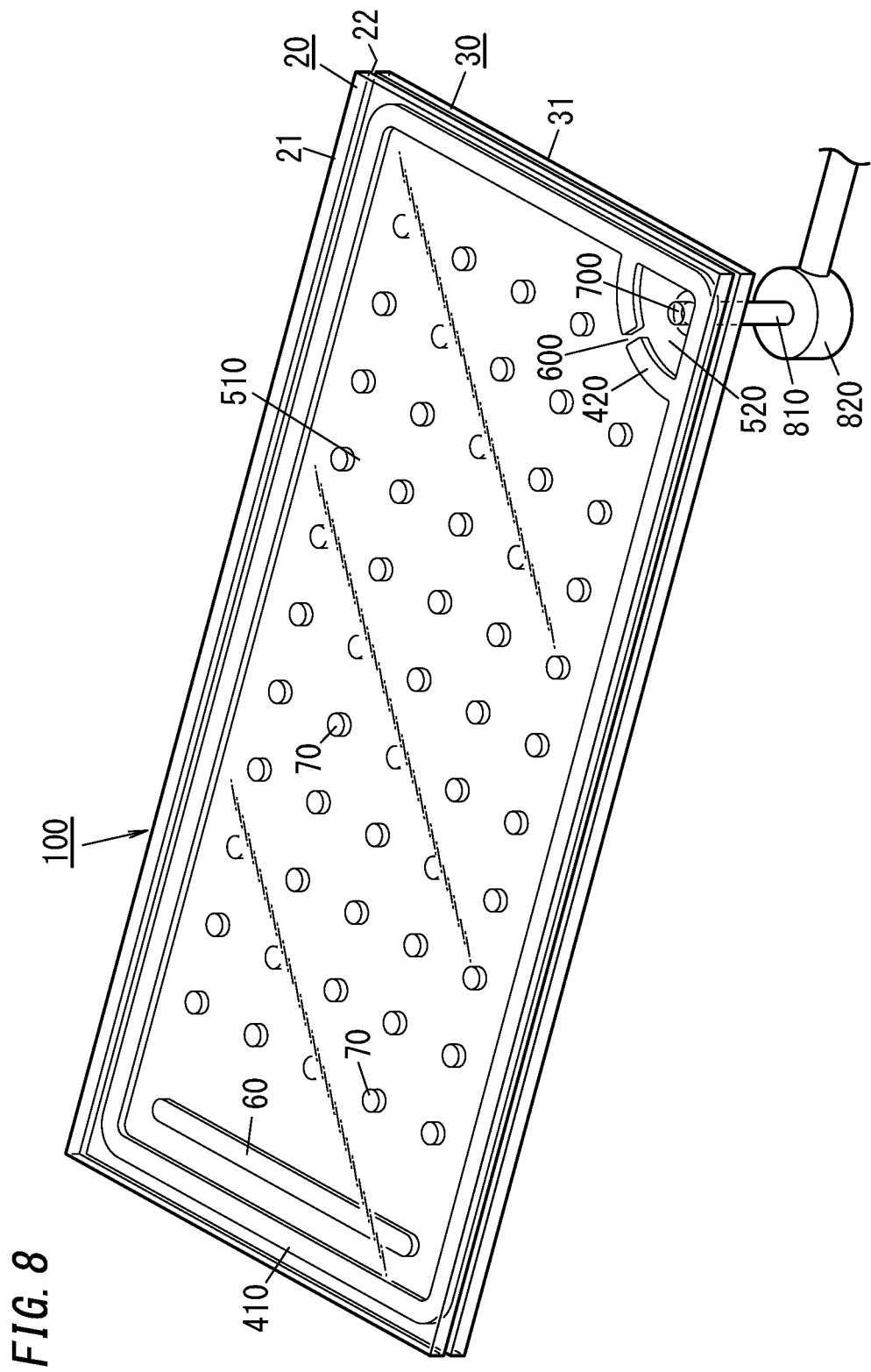
FIG. 8 is a perspective view for illustrating the method for manufacturing the glass panel unit.

Through the aforementioned assembling step (the first melting step), the temporary assembly 100 shown in FIG. 8 can be produced.

The hermetically enclosing step is a step of subjecting the temporary assembly 100 to the above predetermined process to obtain the glass panel unit (completed product) 10. The hermetically enclosing step includes the evacuating step and a melting step (the second melting step). In other words, the evacuating step and the second melting step constitute the above predetermined process.

The evacuating step is a step of converting the first space 510 into the vacuum space 50 by evacuating it by way of the gas passage 600, the second space 520, and the outlet 700 at the predetermined temperature (the evacuation temperature) Te.

Evacuation can be done by a vacuum pump, for example. As shown in FIG. 8, the vacuum pump is connected to the temporary assembly 100 with the evacuation pipe 810 and a sealing head 820. The evacuation pipe 810 is bonded to the second panel 30 so that an inside of the evacuation pipe 810 is connected to the outlet 700, for example. The sealing head 820 is attached to the evacuation pipe 810, and thereby an inlet of the vacuum pump is connected to the outlet 700.

The first melting step, the evacuating step, and the second melting step are performed with the first panel 20 and the second panel 30 (the second panel 30 where the frame 410, the partition 420, the gas passage 600, the outlet 700, the gas adsorbent 60, and the multiple pillars 70 are formed) being left in the furnace. Therefore, the evacuation pipe 810 is bonded to the second panel 30 before the first melting step at the latest.

In the evacuating step, the first space 510 is evacuated by way of the gas passage 600, the second space 520, and the outlet 700 at the evacuation temperature Te for a predetermined time (evacuation time) te (see FIG. 7).

The evacuation temperature Te is set to be higher than the activation temperature (for example, 350° C.) of the getter of the gas adsorbent 60, and also is set to be lower than the first softening point and the second softening point (for example, 434° C.). For example, the evacuation temperature Te is 390° C.

According to the above settings, deformation of the frame 410 and the partition 420 is unlikely to occur. Further, the getter of the gas adsorbent 60 is activated, and thus molecules (gas) adsorbed on the getter are desorbed from the getter. Such molecules (that is, gas) desorbed from the getter are discarded through the first space 510, the gas passage 600, the second space 520, and the outlet 700. Therefore, in the evacuating step, the adsorbability of the gas adsorbent 60 is recovered.

The evacuation time te is set to obtain the vacuum space 50 having a desired degree of vacuum (for example, a degree of vacuum equal to or lower than 0.1 Pa). For example, the evacuation time te is set to 120 minutes.

Note that the degree of vacuum of the vacuum space 50 is not limited particularly. It may be possible that the glass panel unit includes a reduced-pressure space with a pressure smaller than 1 atm, such as 0.5 atm or the like, in place of the vacuum space 50.

The second melting step is a step of forming the seal 40 enclosing the vacuum space 50 by changing the shape of the partition 420 to form the separator 42 closing the gas passage 600. In the second melting step, the second thermal adhesive is melted once at the predetermined temperature (the second melting temperature) Tm2 equal to or higher than the second softening point, and thereby the partition 420 is changed in shape to form the separator 42. In more detail, the first panel 20 and the second panel 30 are heated at the second melting temperature Tm2 for the predetermined time (the second melting time) tm2 in the furnace (see FIG. 7).

The second melting temperature Tm2 and the second melting time tm2 are set to allow the second thermal adhesive to soften to form the separator 42 closing the gas passage 600. A lower limit of the second melting temperature Tm2 is equal to the second softening point (434° C.). Note that, differently from the first melting step, the purpose of the second melting step is to change the shape of the partition 420, and consequently the second melting temperature Tm2 is set to be higher than the first melting temperature (440° C.) Tm1. For example, the second melting temperature Tm2 is set to 460° C. Additionally, the second melting time tm2 is 30 minutes, for example.

In the first embodiment, evacuation may be performed during the evacuating step only, before the second melting step. Alternatively, the evacuation may be performed during the second melting step.

Additionally, in the second melting step, evacuation of the first space 510 through the gas passage 600, the second space 520, and the outlet 700 is continued from the evacuating step. In other words, in the second melting step, the separator 42 closing the gas passage 600 is formed by changing the shape of the partition 420 at the second melting temperature Tm2 while the first space 510 is evacuated through the gas passage 600, the second space 520, and the outlet 700. By doing so, it is possible to more lower a probability that the degree of vacuum of the vacuum space 50 decreases during the second melting step. Note that, the second melting step does not necessarily include evacuating the first space 510 through the gas passage 600, the second space 520, and the outlet 700.

Through the aforementioned preparation step, assembling step, hermetically enclosing step, and removing step, the glass panel unit 10 is produced.

According to the glass panel unit 10 of the first embodiment, the pillars 70 are arranged so as to satisfy a discriminant of the above (formula 15) or the (formula 18). As mentioned above, the (formula 15) is a discriminant obtained without consideration with the elastic deformation of the pillars 70, and the (formula 18) is a discriminant obtained in consideration with the elastic deformation of the pillars 70.

Since components of the glass panel unit 10 satisfy the discriminant, the first panel 20 and the second panel 30 are less likely to be damaged, because the first panel 20 is less likely to collide against the second panel 30 even when the glass panel unit 10 receives the theoretical minimum concentric load causing the breakage of the four pillars 70.

Figure 9:
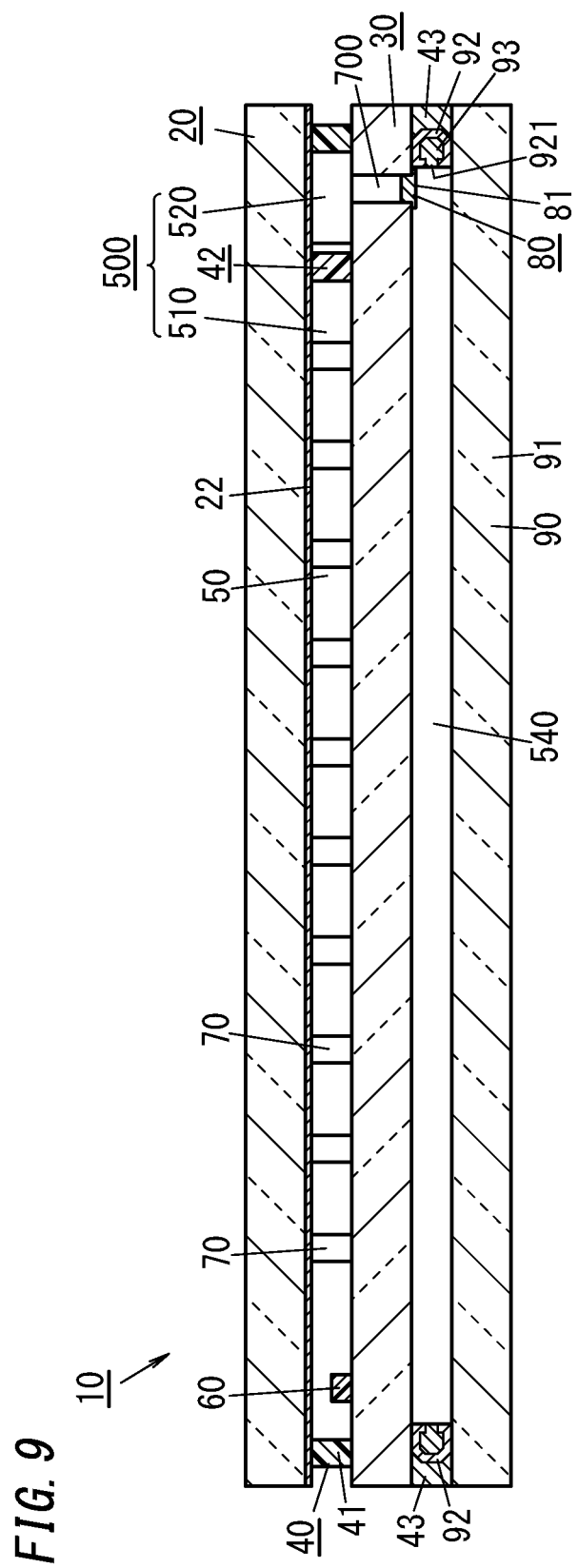
FIG. 9 is a schematic cross-sectional view of a glass panel unit according to a second embodiment of the present disclosure.
Figure 10:
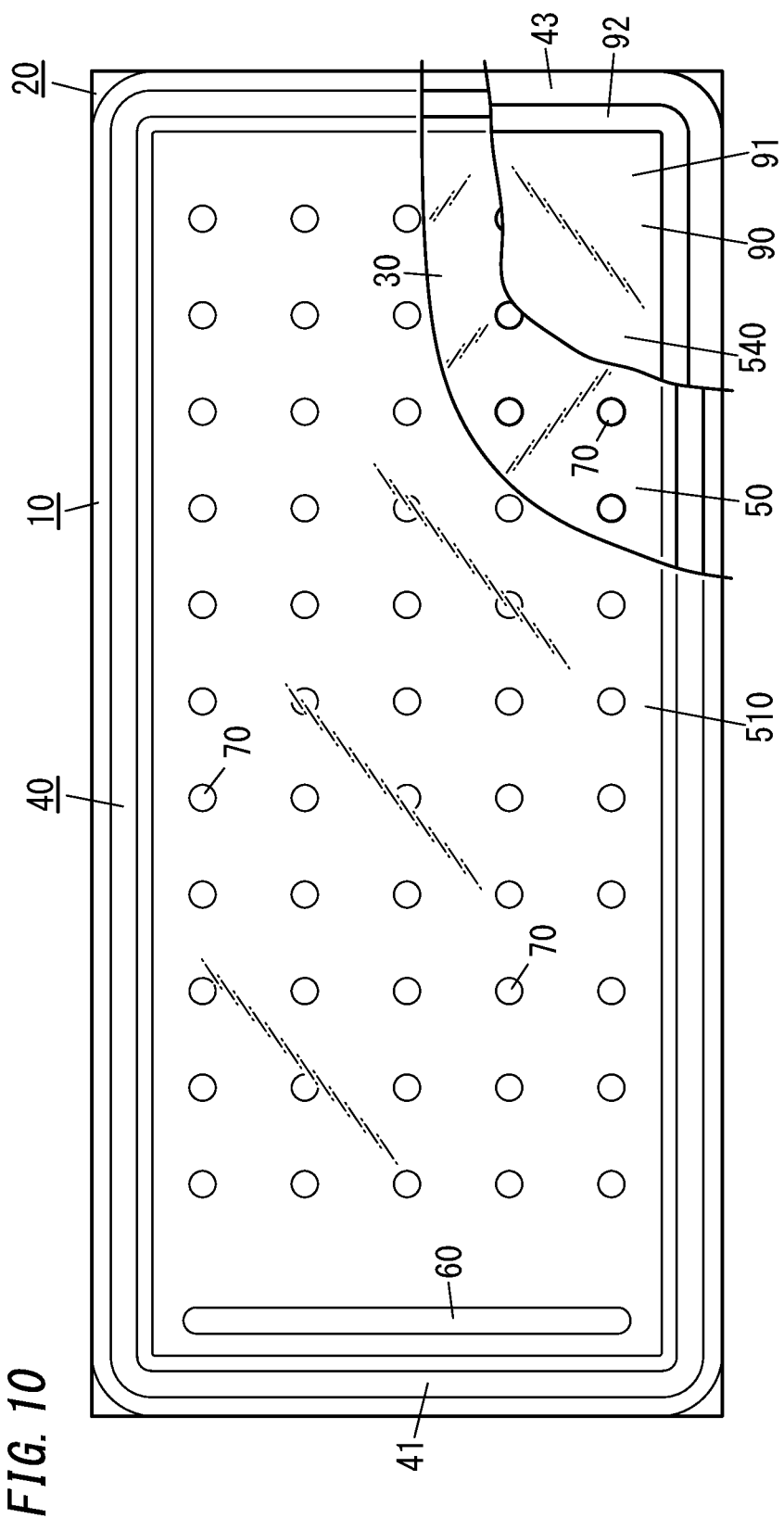
FIG. 10 is a partially cutaway schematic plan view of the glass panel unit.

A glass panel unit 10 of a second embodiment is described with reference to FIG. 9 and FIG. 10. The glass panel unit 10 according to the second embodiment includes additional components, as well as components of the first embodiment.

The glass panel unit 10 of the second embodiment includes a third panel 90 arranged to face a second panel 30. The third panel 90 faces the second panel 30 in the second embodiment, but alternatively, may face a first panel 20.

The third panel 90 includes a third glass plate 91. The third glass plate 91 of the third panel 90 has a flat surface and a predetermined thickness. In the second embodiment, the third panel 90 includes the third glass plate 91 alone.

Alternatively, the third panel 90 may further include a coating provided at either or both faces thereof. The coating may be a film with desired physical property such as an infrared reflective film. In this case, the third panel 90 includes the third glass plate 91 and the coating. In short, the third panel 90 includes at least the third glass plate 91.

The glass panel unit 10 further includes a second seal 43, which is placed between the second panel 30 and the third panel 90 to hermetically bond the second panel 30 and the third panel 90 together. In this case, a seal 40 may be a first seal. The second seal 43 is arranged in a ring between the respective peripheral portions of the second panel 30 and the third panel 90. The second seal 43 may be made of material same as or different from that of the seal 40 without limitation.

The glass panel unit 10 includes a second internal space 540 which is hermetically enclosed by the second panel 30, the third panel 90 and the second seal 43 and which contains a dry gas airtightly. Examples of the dry gas include a dry rare gas such as an argon gas and dry air, without limitation.

In addition, a hollow frame member 92 is arranged in a ring inside of the second seal 43 provided between the respective peripheral portions of the second panel 30 and the third panel 90. A through hole 921 interconnecting an inside space of the frame member 92 and the second internal space 540 is cut in the frame member 92. A desiccant 93 such as a silica gel is introduced in the inside space of the frame member 92.

The second panel 30 and the third panel 90 may be bonded together in almost the same way as the first panel 20 and the second panel 30. Hereinafter, an exemplary method thereof is described.

Firstly, prepared are a component which later constitutes the third panel 90, and an assembly (the glass panel unit 10 of the first embodiment) including the first panel 20 and the second panel 30.

Arranged is a second thermal adhesive, which later constitutes the second seal 43, on the peripheral portion of the face of either the third panel 90 or the second panel 30 in a frame shape (second thermal adhesive arranging step). Material of the thermal adhesive may be same as or different from material of thermal adhesive (first thermal adhesive) which later constitutes a frame 410 without limitation. Further, a through hole interconnecting the second internal space 540 and an outside is formed in the thermal adhesive during this step to form a gas passage (second gas passage).

The third panel 90 and the second panel 30 are disposed to face each other (third panel opposite disposition step).

Thereafter, the thermal adhesive is melted once at temperature sufficient to melt the thermal adhesive constituting the second seal 43 and thereby the second panel 30 and the third panel 90 are hermitically bonded together with the second seal 43 (bonding step). Note that the melting is done so that the second gas passage is not completely closed during this step.

The dry gas is introduced into the second internal space 540 through the second gas passage (dry gas introducing step). According to this step, the second internal space 540 may be filled with the dry gas alone, or may further include residual air without limitation.

The second seal 43 is then heated to close the second gas passage, and thereby the second internal space 540 is airtightly closed (second space closing step).

The glass panel unit 10 is formed according the above mentioned method. The glass panel unit 10 of the second embodiment achieves an even higher degree of thermal insulation properties.

Figure 11:
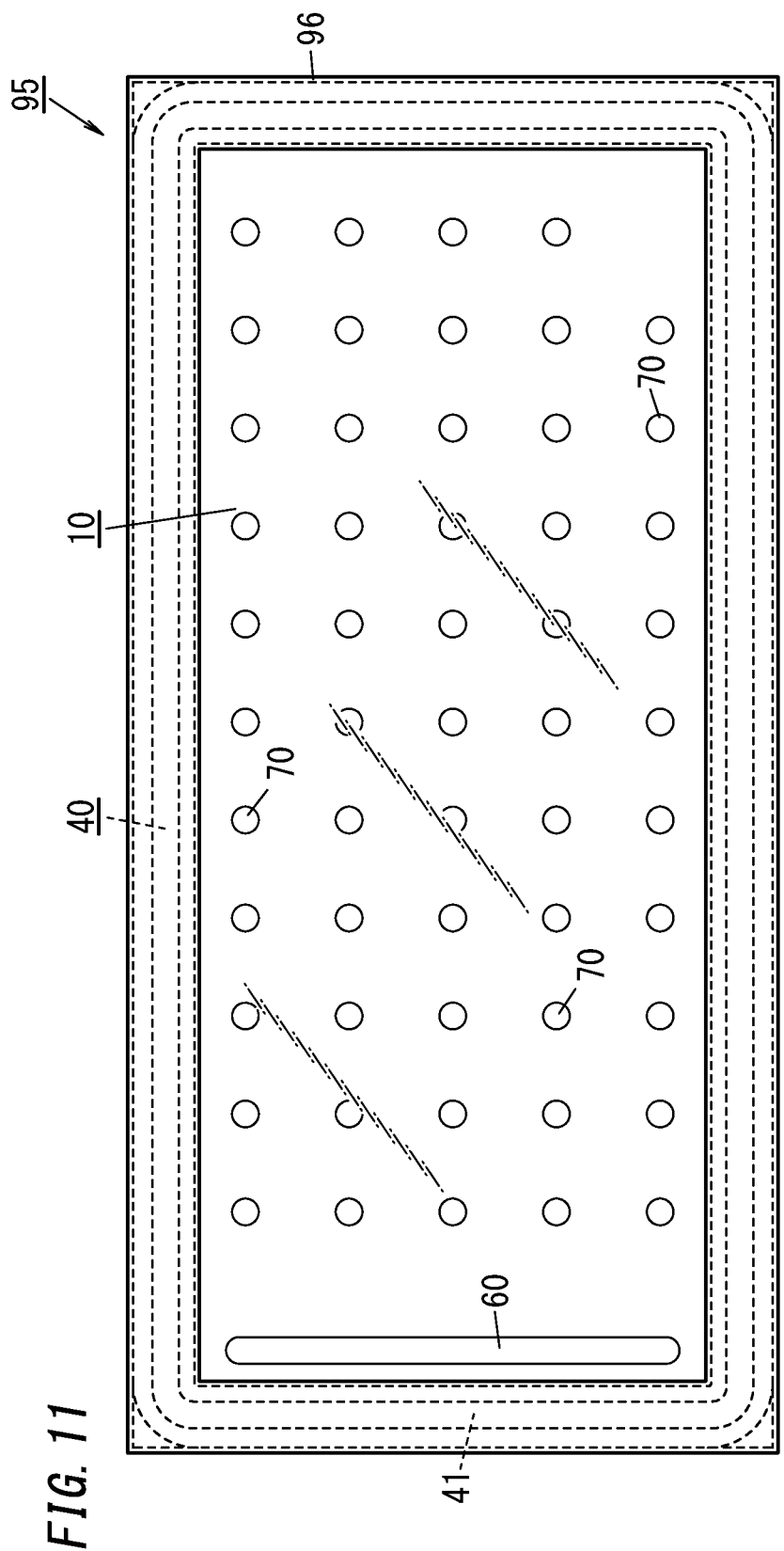
FIG. 11 is a schematic plan view of a glass window including a glass panel unit according to a third embodiment of the present disclosure.

Hereinafter, a third embodiment is described with reference to FIG. 11. Note that the third embodiment is directed to a glass window 95 including the glass panel unit 10 of the first embodiment or the second embodiment.

The glass window 95 of the third embodiment includes the glass panel unit 10 of any one the first embodiment and the second embodiment, and a window frame 96 with a U-cross section is fitted onto the outer peripheral portion of this glass panel unit 10.

The glass window 95 of the third embodiment achieves an even higher degree of thermal insulation properties.

In the above embodiments (which means any of the first embodiment to the third embodiment, same meanings are applied to the following description), the glass panel unit 10 is rectangular, but the glass panel unit 10 may have a desired shape such as a circular shape and a polygonal shape. In other words, each of the first panel 20, the second panel 30, and the seal 40 may not be rectangular and may have a desired shape such as a circular shape and a polygonal shape. Note that, the shapes of the first panel 20, the second panel 30, the frame 410, and the separator 42 may not be limited to the shapes described in the explanation of the above embodiments, and may have such shapes that the glass panel unit 10 can have a desired shape. Note that, the shape and size of the glass panel unit 10 may be determined in consideration of application of the glass panel unit 10.

The first face and the second face, of the first glass plate 21 of the first panel 20 may not be limited to flat faces. Similarly, the first face and the second face, of the second glass plate 31 of the second panel 30 may not be limited to flat faces.

The first glass plate 21 of the first panel 20 and the second glass plate 31 of the second panel 30 may not have the same plan shape and plan size. Further, the first glass plate 21 and the second glass plate 31 may not have the same thickness. Furthermore, the first glass plate 21 and the second glass plate 31 may not be made of the same material. Similarly, the first glass plate 21 of the first panel 20 and the second glass plate 31 of the second panel 30 may not have the same plan shape and plan size. Further, the first glass plate 21 and the second glass plate 31 may not have the same thickness. Furthermore, the first glass plate 21 and the second glass plate 31 may not be made of the same material.

The seal 40 may not have the same plan shape with the first panel 20 and the second panel 30. Similarly, the frame 410 may not have the same plan shape with the first panel 20 and the second panel 30.

The first panel 20 may include a coating which has desired physical properties and is formed on the second face of the first glass plate 21. The first panel 20 may not include the coating 22. In other words, the first panel 20 may include the first glass plate 21 alone.

The second panel 30 may include a coating with desired physical properties. For example, the coating may include at least one of thin films formed on the first face and the second face of the second glass plate 31 respectively. Examples of the coating may include a film reflective for light with a specified wavelength, such as an infrared reflective film or an ultraviolet reflective film.

In the above embodiments, the frame 410 is made of the first thermal adhesive. However, the frame 410 may include other component such as a core, in addition to the first thermal adhesive. In other words, it is sufficient that the frame 410 includes the first thermal adhesive. In the above embodiment, the frame 410 is formed to surround an almost entire region on the second panel 30. However, it is sufficient that the frame 410 is formed to surround a predetermined region on the second panel 30. In other words, there is no need to form the frame 410 so as to surround an almost entire region on the second panel 30.

In the above embodiments, the partition 420 is made of the second thermal adhesive. However, the partition 420 may include other component such as a core, in addition to the second thermal adhesive. In other words, it is sufficient that the partition 420 includes the second thermal adhesive.

In the above embodiments, the internal space 500 is divided into one first space 510 and one second space 520. Note that, the internal space 500 may be divided into one or more first spaces 510 and one or more second spaces 520.

In the above embodiments, the second thermal adhesive is identical to the first thermal adhesive, and the second softening point is equal to the first softening point. However, the second thermal adhesive may be different material from the first thermal adhesive. For example, the second thermal adhesive may have the second softening point different from the first softening point of the first thermal adhesive. In such a case, the second softening point may be preferably higher than the first softening point. In this case, the first melting temperature Tm1 can be set to be equal to or higher than the first softening point and lower than the second softening point. By doing so, it is possible to suppress undesired deformation of the partition 420 in the first melting step.

Additionally, each of the first thermal adhesive and the second thermal adhesive may not be limited to glass frit, but may be selected from low-melting-point metal, hot-melt adhesive, and the like, for example.

In the above embodiments, a furnace is used to heat the frame 410, the gas adsorbent 60, and the partition 420. However, such heating can be done with appropriate heating means. Examples of the heating means may include a laser and a thermally conductive plate connected to a heat source.

In the above embodiment, the outlet 700 is formed in the second panel 30. However, the outlet 700 may be formed in the first glass plate 21 of the first panel 20 or may be formed in the frame 410.

As obviously derived from the aforementioned first to third embodiments and the like, a glass panel unit 10 of the first aspect according to the present disclosure includes a first panel 20 including at least a first glass plate 21; and a second panel 30 including at least a second glass plate 31. The second panel 30 is arranged to face the first panel 20 with a predetermined interval h left with respect to the first panel 20.

The glass panel unit 10 includes: a seal 40 arranged between the first panel 20 and the second panel 30 to hermetically bond the first panel 20 and the second panel 30 together; and an internal space 50 configured to form a reduced-pressure space by being hermetically enclosed by the first panel 20, the second panel 30, and the seal 40.

The glass panel unit 10 includes multiple pillars 70 made of resin. The multiple pillars 70 are arranged in the internal space 50 at individual intersections of a square or rectangular lattice of constant lattice intervals, including a predetermined pitch p, so as to be in contact with the first panel 20 and the second panel 30.

The predetermined pitch p of the multiple pillars 70 is determined such that a distortion $\delta$ of the first panel 20 and second panel 30 is smaller than the predetermined interval h between the first panel 20 and the second panel 30. The distortion $\delta$ is calculated based on the predetermined pitch p, load loading compression fracture $P_0$ per one pillar of the multiple pillars, Young's moduli Eg of the first panel 20 and the second panel 30, thicknesses t of the first panel 20 and the second panel 30, and Poisson's ratios v of the first panel 20 and the second panel 30.

According to the glass panel unit 10 of the first aspect, the first panel 20 and the second panel 30 are less likely to be damaged because the first panel 20 and the second panel 30 are less likely to make contact with each other.

The glass panel unit 10 of the second aspect according to the present disclosure would be realized in combination with the first aspect. In the second aspect, the predetermined pitch p of the multiple pillars 70 is determined such that the distortion $\delta$ of the first panel 20 and second panel 30 is smaller than the predetermined interval h between the first panel 20 and the second panel 30. The distortion $\delta$ is calculated further based on Young's modulus Esp of each pillar 70, and a cross-section area S of each pillar 70, in addition to the predetermined pitch p, the predetermined interval h between the first panel 20 and the second panel 30, the load loading compression fracture $P_0$ per one pillar of the multiple pillars 70, the Young's moduli Eg of the first panel 20 and the second panel 30, the thicknesses t of the first panel 20 and the second panel 30, and the Poisson's ratios v of the first panel 20 and the second panel 30.

According to the glass panel unit 10 of the second aspect, the first panel 20 and the second panel 30 are further less likely to be damaged because the first panel 20 and the second panel 30 are further less likely to make contact with each other.

The glass panel unit 10 of the third aspect according to the present disclosure would be realized in combination with the first aspect. In the third aspect, the multiple pillars 70 are arranged so as to satisfy a formula below:

$$h - 0.232 \cdot P_0 \cdot p^2/(Eg \cdot t^3/(12 \cdot (1-v^2))) > 0,$$

where p (m) denotes the predetermined pitch, h (m) denotes the predetermined interval between the first panel 20 and the second panel 30, $P_0$ (N) denotes the load loading compression fracture per one pillar of the multiple pillars 70, Eg (Pa) denotes the Young's modulus of each of the first panel 20 and the second panel 30, t (m) denotes the thickness of each of the first panel 20 and the second panel 30, and v denotes the Poisson's ratio of each of the first panel 20 and the second panel 30.

According to the glass panel unit 10 of the third aspect, the first panel 20 and the second panel 30 are further less likely to be damaged because the first panel 20 and the second panel 30 are further less likely to make contact with each other.

The glass panel unit 10 of the fourth aspect according to the present disclosure would be realized in combination with the second aspect. In the fourth aspect, the multiple pillars 70 are arranged so as to satisfy a formula below:

$$h - 0.232 \cdot P_0 \cdot p^2/(Eg \cdot t^3/(12 \cdot (1-v^2))) - P_o/(3 \cdot Esp \cdot S) > 0,$$

where p (m) denotes the predetermined pitch, h (m) denotes the predetermined interval between the first panel 20 and the second panel 30, $P_0$ (N) denotes the load loading compression fracture per one pillar of the multiple pillars 70, Eg (Pa) denotes the Young's modulus of each of the first panel 20 and the second panel 30, t (m) denotes the thickness of each of the first panel 20 and the second panel 30, v denotes the Poisson's ratio of each of the first panel 20 and the second panel 30, Esp (Pa) denotes the Young's modulus of each pillar 70, and S ($m^2$) denotes the cross-section area of each pillar 70.

According to the glass panel unit 10 of the fourth aspect, the first panel 20 and the second panel 30 are further less likely to be damaged because the first panel 20 and the second panel 30 are further less likely to make contact with each other.

The glass panel unit 10 of the fifth aspect according to the present disclosure would be realized in combination with any one of the first to fourth aspects. In the fifth aspect, the glass panel unit 10 includes a third panel 90 including at least a third glass plate 91 and arranged to face the second panel 30.

The glass panel unit 10 further includes a second seal 43 arranged between the second panel 30 and the third panel 90 to hermetically bond the second panel 30 and the third panel 90 together.

The glass panel unit 10 further includes a second internal space 540 hermetically enclosed by the second panel 30, the third panel 90, and the second seal 43 and containing a dry gas airtightly.

The glass panel unit 10 of the fifth aspect can achieve an even higher degree of thermal insulation properties.

A glass window 95 of the sixth aspect according to the present disclosure includes the glass panel unit 10 of any one of the first to fifth aspects, and a window frame 96 fitted onto a peripheral portion of the glass panel unit 10.

The glass window 95 of the fourth aspect can achieve an even higher degree of thermal insulation properties.

A method for manufacturing glass panel unit 10 of a seventh aspect according to the present disclosure includes an adhesive disposing step, a pillar arranging step, an opposite disposition step, an internal space forming step, a pressure reducing step, and a reduced-pressure space forming step.

The adhesive disposing step includes disposing a thermal adhesive in a frame on a first panel 20 including at least a first glass plate 21.

The pillar arranging step includes disposing multiple pillars 70 made of resin on the first panel 20 so as to be arranged at individual intersections of a square or rectangular lattice of constant lattice intervals, including a predetermined pitch p.

The opposite disposition step includes disposing a second panel 30 including at least a second glass plate 31 to face the first panel 20.

The internal space forming step includes heating a glass composite including the first panel 20, the second panel 30, and the thermal adhesive to melt the thermal adhesive to form an internal space 50 enclosed by the first panel 20, the second panel 30 and a melted substance of the thermal adhesive with an evacuation passage left opened to an outside, the evacuation passage being capable of evacuating gas to the outside.

The pressure reducing step includes removing gas in the internal space 50 to reduce a pressure of the internal space 50.

The reduced-pressure space forming step includes hermetically enclosing the internal space 50 while keeping the internal space 50 in a pressure-reduced state to form a reduced-pressure space enclosed hermetically.

The predetermined pitch p of the multiple pillars 70 are determined such that a distortion δ of the first panel 20 and second panel 30 is smaller than an interval h between the first panel 20 and the second panel 30. The distortion δ is calculated based on the predetermined pitch p, load loading compression fracture $P_0$ per one pillar of the multiple pillars, Young's moduli Eg of the first panel 20 and the second panel 30, thicknesses t of the first panel 20 and the second panel 30, and Poisson's ratios v of the first panel 20 and the second panel 30.

According to the glass panel unit 10 of the seventh aspect, the first panel 20 and the second panel 30 are less likely to be damaged because the first panel 20 and the second panel 30 are less likely to make contact with each other.

The glass panel unit 10 of the eighth aspect according to the present disclosure would be realized in combination with the seventh aspect. In the eighth aspect, the predetermined pitch p of the multiple pillars 70 is determined such that the distortion δ of the first panel 20 and second panel 30 is smaller than the interval h between the first panel 20 and the second panel 30. The distortion δ is calculated further based on Young's modulus Esp of each pillar 70, and a cross-section area S of each pillar 70, in addition to the predetermined pitch p, the interval h between the first panel 20 and the second panel 30, the load loading compression fracture $P_0$ per one pillar of the multiple pillars, the Young's moduli Eg of the first panel 20 and the second panel 30, the thicknesses t of the first panel 20 and the second panel 30, and the Poisson's ratios v of the first panel 20 and the second panel 30.

According to the glass panel unit 10 of the eighth aspect, the first panel 20 and the second panel 30 are less likely to be damaged because the first panel 20 and the second panel 30 are less likely to make contact with each other.

The glass panel unit 10 of the ninth aspect according to the present disclosure would be realized in combination with the seventh aspect. In the ninth aspect, the multiple pillars 70 are arranged so as to satisfy a formula below:

$$h - 0.232 \cdot P_0 \cdot p^2 / (Eg \cdot t^3 / (12 \cdot (1 \cdot v^2))) > 0,$$

where p (m) denotes the predetermined pitch, h (m) denotes the interval between the first panel 20 and the second panel 30, $P_0$ (N) denotes the load loading compression fracture per one pillar of the multiple pillars 70, Eg (Pa) denotes the Young's modulus of each of the first panel 20 and the second panel 30, t (m) denotes the thickness of each of the first panel 20 and the second panel 30, and v denotes the Poisson's ratio of each of the first panel 20 and the second panel 30.

According to the glass panel unit 10 of the ninth aspect, the first panel 20 and the second panel 30 are less likely to be damaged because the first panel 20 and the second panel 30 are less likely to make contact with each other.

The glass panel unit 10 of the tenth aspect according to the present disclosure would be realized in combination with the eighth aspect. In the tenth aspect, the multiple pillars 70 are arranged so as to satisfy a formula below:

$$h - 0.232 \cdot P_0 \cdot p^2 / (Eg \cdot t^3 / (12 \cdot (1 - v^2))) - P_0 / (3 \cdot Esp \cdot S) > 0,$$

where p (m) denotes the predetermined pitch, h (m) denotes the interval between the first panel 20 and the second panel 30, $P_0$ (N) denotes the load loading compression fracture per one pillar of the multiple pillars 70, Eg (Pa) denotes the Young's modulus of each of the first panel 20 and the second panel 30, t (m) denotes the thickness of each of the first panel 20 and the second panel 30, v denotes the Poisson's ratio of each of the first panel 20 and the second panel 30, Esp (Pa) denotes the Young's modulus of each pillar 70, and S ($m^2$) denotes the cross-section area of each pillar 70.

According to the glass panel unit 10 of the tenth aspect, the first panel 20 and the second panel 30 are less likely to be damaged because the first panel 20 and the second panel 30 are less likely to make contact with each other.

REFERENCE SINGS LIST

10 Glass Panel Unit
20 First Panel
21 First Glass Plate
30 Second Panel
31 Second Glass Plate
40 Seal
43 Second Seal
70 Pillar
90 Third Panel
91 Third Glass Plate
95 Glass Window
96 Window Frame
500 Internal Space
540 Second Internal Space

The invention claimed is:

1. A glass panel unit, comprising:
a first panel including at least a first glass plate;
a second panel including at least a second glass plate, the second panel being arranged to face the first panel with a predetermined interval left with respect to the first panel;
a seal arranged between the first panel and the second panel to hermetically bond the first panel and the second panel together;
an internal space configured to form a reduced-pressure space by being hermetically enclosed by the first panel, the second panel, and the seal; and
multiple pillars made of resin, the multiple pillars being arranged in the internal space at individual intersections of a square or rectangular lattice of constant lattice intervals, including a predetermined pitch, so as to be in contact with the first panel and the second panel, wherein:
the multiple pillars are arranged so as to satisfy a formula below:

$$h - 0.232 \cdot P_0 \cdot p^2 / (Eg \cdot t^3 / (12 \cdot (1-v^2))) > 0,$$

where p (m) denotes the predetermined pitch, h (m) denotes the predetermined interval between the first panel and the second panel, $P_0$ (N) denotes the load loading compression fracture per one pillar of the multiple pillars, Eg (Pa) denotes the Young's modulus of each of the first panel and the second panel, t (m) denotes the thickness of each of the first panel and the second panel, and v denotes the Poisson's ratio of each of the first panel and the second panel.

2. The glass panel unit of claim 1, further comprising:
a third panel including at least a third glass plate and arranged to face the second panel;
a second seal arranged between the second panel and the third panel to hermetically bond the second panel and the third panel together; and
a second internal space hermetically enclosed by the second panel, the third panel, and the second seal and containing a dry gas airtightly.

3. A glass window comprising:
the glass panel unit of claim 1; and
a window frame fitted onto a peripheral portion of the glass panel unit.

4. A method for manufacturing glass panel unit, comprising:
an adhesive disposing step of disposing a thermal adhesive in a frame on a first panel including at least a first glass plate;
a pillar arranging step of disposing multiple pillars made of resin on the first panel so as to be arranged at individual intersections of a square or rectangular lattice of constant lattice intervals, including a predetermined pitch;
an opposite disposition step of disposing a second panel including at least a second glass plate to face the first panel;
an internal space forming step of heating a glass composite including the first panel, the second panel, and the thermal adhesive to melt the thermal adhesive to form an internal space enclosed by the first panel, the second panel and a melted substance of the thermal adhesive with an evacuation passage left opened to an outside, the evacuation passage being capable of evacuating gas to the outside;
a pressure reducing step of removing gas in the internal space to reduce a pressure of the internal space; and
a reduced-pressure space forming step of hermetically enclosing the internal space while keeping the internal space in a pressure-reduced state to form a reduced-pressure space enclosed hermetically, wherein:
the multiple pillars are arranged so as to satisfy a formula below:

$$h - 0.232 \cdot P_0 \cdot p^2 / (Eg \cdot t^3 / (12 \cdot (1-v^2))) > 0,$$

where p (m) denotes the predetermined pitch, h (m) denotes the interval between the first panel and the second panel, $P_0$ (N) denotes the load loading compression fracture per one pillar of the multiple pillars, Eg (Pa) denotes the Young's modulus of each of the first panel and the second panel, t (m) denotes the thickness of each of the first panel and the second panel, and v denotes the Poisson's ratio of each of the first panel and the second panel.

* * * * *